US012381322B2

(12) United States Patent
Cai et al.

(10) Patent No.: US 12,381,322 B2
(45) Date of Patent: Aug. 5, 2025

(54) ANTENNA APPARATUS AND ELECTRONIC DEVICE

(71) Applicant: HONOR DEVICE CO., LTD., Shenzhen (CN)

(72) Inventors: Xiaotao Cai, Shenzhen (CN); Tiezhu Liang, Shenzhen (CN); Yafang Yu, Shenzhen (CN); Wenlong Hu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 88 days.

(21) Appl. No.: 18/044,639

(22) PCT Filed: Jan. 24, 2022

(86) PCT No.: PCT/CN2022/073600

§ 371 (c)(1),
(2) Date: Mar. 9, 2023

(87) PCT Pub. No.: WO2022/218005

PCT Pub. Date: Oct. 20, 2022

(65) Prior Publication Data

US 2024/0297436 A1 Sep. 5, 2024

(30) Foreign Application Priority Data

Apr. 12, 2021 (CN) ......................... 202110391085.0

(51) Int. Cl.
*H01Q 5/342* (2015.01)
*H01Q 1/24* (2006.01)
*H01Q 9/42* (2006.01)

(52) U.S. Cl.
CPC ............. *H01Q 5/342* (2015.01); *H01Q 1/243* (2013.01); *H01Q 9/42* (2013.01)

(58) Field of Classification Search
CPC ........... H01Q 5/342; H01Q 1/243; H01Q 9/42
See application file for complete search history.

(56) References Cited

U.S. PATENT DOCUMENTS 9,099,784 B2 8/2015 Jiang et al.
10,886,614 B2 1/2021 Lee et al.
(Continued)

FOREIGN PATENT DOCUMENTS

CN 102110900 A 6/2011
CN 102280696 A 12/2011
(Continued)

*Primary Examiner* — Dieu Hien T Duong
(74) *Attorney, Agent, or Firm* — Fish & Richardson P.C.

(57) ABSTRACT

Embodiments of this application provide an antenna apparatus and an electronic device. The antenna apparatus is provided with a non-resonant unit and a feed unit, to respectively feed a radiation unit and a non-resonant unit. Through feeding power distribution design, the non-resonant unit can assist in exciting a floor characteristic mode. In addition, since a size of the non-resonant unit is much smaller than an electrical length required for resonance of an antenna on this frequency band, the non-resonant unit does not generate a resonance curve on a resonance curve and has no resonance point, to improve radiation efficiency of the antenna without generating new resonance, so as to improve a use effect of a user.

14 Claims, 28 Drawing Sheets

(56) References Cited

U.S. PATENT DOCUMENTS

| | | | |
|---|---|---|---|
| 11,276,930 B2 | 3/2022 | Zhou et al. | |
| 2004/0080457 A1 | 4/2004 | Guo et al. | |
| 2005/0052322 A1 | 3/2005 | Park et al. | |
| 2014/0313087 A1 * | 10/2014 | Jiang | H01Q 3/22 343/745 |
| 2019/0214727 A1 * | 7/2019 | Mikawa | H01Q 1/243 |
| 2020/0106177 A1 | 4/2020 | Zhou et al. | |
| 2020/0279469 A1 * | 9/2020 | Giessel | G08B 21/182 |

FOREIGN PATENT DOCUMENTS

| | | | |
|---|---|---|---|
| CN | 103825075 | A | 5/2014 |
| CN | 104241862 | A | 12/2014 |
| CN | 109921174 | A | 6/2019 |
| CN | 111029729 | A | 4/2020 |
| CN | 111628298 | A | 9/2020 |
| CN | 111641040 | A | 9/2020 |
| CN | 112204815 | A | 1/2021 |
| CN | 113258268 | A | 8/2021 |
| JP | 2011139122 | A | 7/2011 |
| TW | 201541718 | A | 11/2015 |

* cited by examiner

Surface current (f = 2.3) [Mode 2]
Frequency 2.3 GHz
Phase 0°
Maximum 5.27406 A/m Surface current (f = 0.9) [AC1]
Frequency 0.9 GHz
Phase 0°
Maximum 81.6603 A/m

ANTENNA APPARATUS AND ELECTRONIC DEVICE

This application is a national stage of International Application No. PCT/CN2022/073600, filed on Jan. 24, 2022, which claims priority to Chinese Patent Application No. 202110391085.0, filed on Apr. 12, 2021. The disclosures of the aforementioned applications are hereby incorporated by reference in their entireties.

TECHNICAL FIELD

Embodiments of this application relate to the field of terminal technologies, and in particular, to an antenna apparatus and an electronic device.

BACKGROUND

With development of information technologies, wireless performance of terminal products has been drawing more and more attention, and the wireless performance of an antenna directly affects actual user experience. However, after entering an era of 5G, an existing terminal mobile phone has developed towards a full screen and multi-antenna trend. As a result, a size of a radiator of the antenna becomes increasingly large, a radiation environment deteriorates, and antenna performance also becomes worse. In a plurality of frequency bands of the antenna, based on a relationship between a frequency band and wavelength resonance, the lower the frequency is, the longer the required radiator is, and the higher the space requirement is. Therefore, if a screen is a full screen, how to improve the antenna performance, especially low-frequency antenna performance, in a limited space environment and a radiator length, has become an important problem in research and design of a terminal antenna.

In an example in which an electronic device is a mobile phone, in a conventional technology, different antenna structures are generally designed at different spatial positions on the mobile phone. Specifically, different resonant antennas may be arranged at different positions in the mobile phone space to meet antenna requirements in different scenarios based on actual scenario requirements. In this way, if one of the antennas is blocked, an antenna distributed in another spatial position can be selected to operate, thereby satisfying a requirement of the terminal product for the antenna performance.

However, available space in the mobile phone is limited, and the antenna structure in the foregoing solution occupies an excessive design area in the mobile phone. This is unfavorable to a layout of another component in the mobile phone. Therefore, how to meet the requirement of the antenna performance in small space has become an important problem in research and design of an antenna.

SUMMARY

Embodiments of this application provide an antenna apparatus and electronic device, to improve radiation efficiency of an antenna without occupying too much design space in a mobile phone and without affecting a resonance curve of an existing antenna, so as to improve actual user experience.

A first aspect of embodiments of this application provides an antenna apparatus. The antenna apparatus is applied to an electronic device, and the antenna apparatus includes: at least one radiation unit, at least one feed unit, and at least one non-resonant unit, where the feed unit directly feeds the radiation unit and the non-resonant unit separately; and a size of the non-resonant unit is less than ⅛λ, and λ is a wavelength corresponding to a resonance frequency of the radiation unit.

According to the antenna apparatus provided in this embodiment of the application, the antenna apparatus is provided with the non-resonant unit and the feed unit, to respectively feed the radiation unit and the non-resonant unit. Through feeding power distribution design, the non-resonant unit can assist in exciting a floor characteristic mode. In addition, since the size of the non-resonant unit is much smaller than an electrical length required for resonance of an antenna on this frequency band, the non-resonant unit does not generate a resonance curve on a resonance curve and has no resonance point, to improve radiation efficiency of the antenna without generating new resonance, so as to improve a use effect of a user.

In a possible implementation, a feed point and a ground point of the feed unit are respectively electrically connected to the non-resonant unit and a metal middle plate used as a floor in the electronic device. Through a power distribution of a feed connection, the feed point of the feed unit is connected to the non-resonant unit, and the ground point of the feed unit is connected to the floor (that is, the metal middle plate), to assist in exciting a floor characteristic mode.

In a possible implementation, the non-resonant unit is configured to assist in exciting a floor characteristic mode; and when the radiation unit is a low-frequency radiation unit, the non-resonant unit assists in exciting a floor longitudinal characteristic mode; or when the radiation unit is a medium-high frequency radiation unit, the non-resonant unit assists in exciting a floor transverse characteristic mode. A current flow direction of the low-frequency radiation unit is in a longitudinal mode, and a current flow direction of the medium-high frequency radiation unit is in a transverse mode, so that high antenna efficiency at a corresponding frequency can be obtained by exciting a required floor characteristic mode. That is, for the low-frequency radiation unit, high radiation efficiency can be obtained by sufficiently exciting the floor longitudinal mode; and for the medium-high frequency radiation unit, high radiation efficiency can also be obtained by sufficiently exciting the transverse mode.

In a possible implementation, an orthographic projection that is of the non-resonant unit and that is in a first direction is located in the metal middle plate; and the first direction is the direction perpendicular to a plane in which the metal middle plate is located. Through a power distribution of a feed connection, the feed unit is connected to each of the non-resonant unit and a floor (that is, the metal middle plate) below the non-resonant unit, thereby assisting in exciting the floor characteristic mode.

In a possible implementation, the feed unit is electrically connected to each of the non-resonant unit and the metal middle plate by using a feed line. Through a line power distribution of the feed line for the feed connection, the feed unit is connected to each of the non-resonant unit and a floor (that is, the metal middle plate) below the non-resonant unit through the feed line, thereby assisting in exciting the floor characteristic mode.

In a possible implementation, each feed line includes a main feed line and a sub-feed line, the main feed line and the sub-feed line each include a signal line and a ground line, a signal line at a first end of the main feed line is electrically connected to the feed unit, and a signal line at a second end of the main feed line is electrically connected to the radiation unit; and the ground line of the main feed line is grounded;

and a signal line and a ground line at a first end of the sub-feed line are electrically connected to the signal line and the ground line of the main feed line, and a signal line and a ground line at a second end of the sub-feed line are electrically connected to the non-resonant unit and the metal middle plate respectively.

In this way, the feed unit can separately feed the radiation unit and the non-resonant unit, and efficiency of the antenna can be effectively improved through a power distribution at a feed location and a connection to the non-resonant unit and the floor (that is, the metal middle plate) at the non-resonant unit.

In a possible implementation, the sub-feed line is a coaxial line and includes an outer conductor and an inner conductor; the outer conductor is wrapped outside the inner conductor, the inner conductor is the signal line, and the outer conductor is the ground line; and one end of the inner conductor is electrically connected to the signal line of the main feed line, and the other end of the inner conductor is electrically connected to the non-resonant unit; and one end of the outer conductor is electrically connected to the ground line of the main feed line, and the other end of the outer conductor is electrically connected to the metal middle plate.

The inner conductor of the sub-feed line is electrically connected to the non-resonant unit, and the outer conductor of the sub-feed line is electrically connected to the floor (that is, the metal middle plate) at the non-resonant unit, so that while assisting in exciting the floor characteristic mode, the metal middle plate connected to the outer conductor can provide a specific shielding effect for the non-resonant unit connected to the inner conductor.

In a possible implementation, the main feed line is a microstrip line including a first conductor and a second conductor, the first conductor is the signal line, the second conductor is the ground line, and the first conductor is separated from the second conductor. In this way, transmission of a power supply signal and a ground signal between the feed unit and the radiation unit can be ensured.

In a possible implementation, a quantity of non-resonant units is one; a quantity of feed lines is at least two; the at least one feed unit includes a first feed unit and a second feed unit; and a feed point and a ground point of the first feed unit are respectively electrically connected to the non-resonant unit and the metal middle plate by using a first feed line of the at least two feed lines, and a feed point and a ground point of the second feed unit are respectively electrically connected to the non-resonant unit and the metal middle plate by using a second feed line of the at least two feed lines.

In a possible implementation, the at least one radiation unit includes a first radiation unit and a second radiation unit; the signal line at the first end of the main feed line of the first feed line is electrically connected to the first feed unit, and the signal line at the second end of the main feed line of the first feed line is electrically connected to the first radiation unit; the ground line of the main feed line of the first feed line is grounded; and the signal line and the ground line at the first end of the sub-feed line of the first feed line are electrically connected to the signal line and the ground line of the main feed line of the first feed line, and the signal line and the ground line at the second end of the sub-feed line of the first feed line are electrically connected to the non-resonant unit and the metal middle plate respectively; and the signal line at the first end of the main feed line of the second feed line is electrically connected to the second feed unit, and the signal line at the second end of the main feed line of the second feed line is electrically connected to the second radiation unit; the ground line of the main feed line of the second feed line is grounded, and the signal line and the ground line at the first end of the sub-feed line of the second feed line are electrically connected to the signal line and the ground line of the main feed line of the second feed line, and the signal line and the ground line at the second end of the sub-feed line of the second feed line are electrically connected to the non-resonant unit and the metal middle plate respectively.

In this way, the first feed unit is connected to the first radiation unit, the non-resonant unit, and the floor below the non-resonant unit (that is, the metal middle plate) by using the first feed line, the second feed unit is connected to the second radiation unit, the non-resonant unit, and the floor below the non-resonant unit (that is, the metal middle plate) by using the second feed line. That is, through a line power distribution, the first feed unit feeds the first radiation unit and the non-resonant unit by using the first feed line, and the second feed unit feeds the second radiation unit and the non-resonant unit by using the second feed line, so that the non-resonant unit can assist the first radiation unit and the second radiation unit in exciting the floor characteristic mode.

In a possible implementation, a quantity of non-resonant units is two; the at least one non-resonant unit includes a first non-resonant unit and a second non-resonant unit; a quantity of feed lines is at least two; the at least one feed unit includes a first feed unit and a second feed unit; and the first feed unit is electrically connected to each of the first non-resonant unit and the metal middle plate by using a first feed line of the at least two feed lines, and the second feed unit is electrically connected to each of the second non-resonant unit and the metal middle plate by using a second feed line of the at least two feed lines.

In a possible implementation, the at least one radiation unit includes a first radiation unit and a second radiation unit; the signal line at the first end of the main feed line of the first feed line is electrically connected to the first feed unit, and the signal line at the second end of the main feed line of the first feed line is electrically connected to the first radiation unit; the ground line of the main feed line of the first feed line is grounded; and the signal line and the ground line at the first end of the sub-feed line of the first feed line are electrically connected to the signal line and the ground line of the main feed line of the first feed line, and the signal line and the ground line at the second end of the sub-feed line of the first feed line are electrically connected to the first non-resonant unit and the metal middle plate respectively; and the signal line at the first end of the main feed line of the second feed line is electrically connected to the second feed unit, and a signal line at a second end of the main feed line of the second feed line is electrically connected to the second radiation unit; the ground line of the main feed line of the second feed line is grounded; and the signal line and the ground line at the first end of the sub-feed line of the second feed line are electrically connected to the signal line and the ground line of the main feed line of the second feed line, and the signal line and the ground line at the second end of the sub-feed line of the second feed line are electrically connected to the second non-resonant unit and the metal middle plate respectively.

In this way, the first feed unit is connected to the first radiation unit, the first non-resonant unit, and the floor below the first non-resonant unit (that is, the metal middle plate) by using the first feed line, the second feed unit is connected to the second radiation unit, the second non-resonant unit, and the floor below the second non-resonant unit (that is, the metal middle plate) by using the second feed line. That is, through a line power distribution, the first feed unit feeds the first radiation unit and the first non-resonant unit by using the first feed line, and the second feed unit feeds the second radiation unit and the second non-resonant unit by using the second feed line, so that the first non-resonant unit can assist the first radiation unit in exciting the floor characteristic mode, and the second non-resonant unit can assist the second radiation unit in exciting the floor characteristic mode.

In a possible implementation, the first radiation unit is a low frequency radiation unit, and the second radiation unit is a medium-high frequency radiation unit.

In a possible implementation, the sub-feed line is provided with a switch for selecting to turn on the non-resonant unit on the sub-feed line. The switch can control the main feed line and the non-resonant unit to be connected or disconnected, thereby ensuring flexible use. For example, if the non-resonant unit is not required to assist in exciting the floor characteristic mode, the switch can be turned on; or if the non-resonant unit is required to assist in exciting the floor characteristic mode, the switch can be turned off.

In a possible implementation, the radiation unit is a metal border frame antenna, and the non-resonant unit is disposed close to the metal border frame antenna. The non-resonant unit is disposed close to the metal border frame antenna, so that a length of the feed line can be reduced to some extent, thereby reducing costs and improving reliability.

A second aspect of embodiments of this application further provides an electronic device, where the electronic device includes at least a display, a rear housing, and a middle frame between the display and the rear housing, and further includes any one of the antenna apparatus.

According to the electronic device provided in this embodiment of the application, the electronic device includes at least an antenna apparatus. The antenna apparatus is provided with a non-resonant unit and a feed unit, to respectively feed a radiation unit and the non-resonant unit. Through feeding power distribution design, the non-resonant unit can assist in exciting a floor characteristic mode. In addition, since a size of the non-resonant unit is much smaller than an electrical length required for resonance of an antenna on this frequency band, the non-resonant unit does not generate a resonance curve on a resonance curve and has no resonance point, to improve radiation efficiency of the antenna without generating new resonance, so as to improve a use effect of a user.

In a possible implementation, the middle frame is a metal middle frame, the metal middle frame includes at least a metal border frame and a metal middle plate, and the metal border frame is disposed around an outer periphery of the metal middle plate; and the metal border frame forms a metal border frame antenna, and the metal border frame antenna is used as at least one radiation unit in the antenna apparatus.

DESCRIPTION OF REFERENCE NUMERALS

100—Antenna apparatus; 10—Radiation unit; 101—First radiation unit;
102—Second radiation unit; 20—Feed unit; 201—First feed unit;
202—Second feed unit; 30—Non-resonant unit; 301—First non-resonant unit;
302—Second non-resonant unit; 40—Feed line; 41—First feed line;
42—Second feed line; 401—Main feed line; 4011—First end of main feed line;
4012—Second end of main feed line; 4013—First conductor; 4014—Second conductor;
402—Sub-feed line; 4021—First end of sub-feed line; 4022—Second end of sub-feed line;
4023—Inner conductor; 4024—Outer conductor; 4025—Switch;
L1—First direction; 200—Mobile phone; 21—Display;
211—Opening; 22—Middle frame; 221—Metal middle plate;
222—Border frame; 2221—Top border frame; 2222—Bottom border frame;
2223—Left border frame; 2224—Right border frame; 23—Circuit board;
24—Battery; and 25—Rear housing.

DESCRIPTION OF EMBODIMENTS

Terms used in implementations of this application are only used to explain specific embodiments of this application, and are not intended to limit this application. The following clearly describes implementations in embodiments of this application with reference to accompanying drawings.

Embodiments of this application provide an electronic device that may include, but is not limited to, a mobile or fixed terminal having an antenna apparatus, such as a mobile phone, a tablet computer, a notebook computer, an ultra-mobile personal computer (ultra-mobile personal computer, UMPC), a handheld computer, a walkie-talkie, a netbook, a point of sales (Point of sales, POS), a personal digital assistant (personal digital assistant, PDA), a wearable device, a virtual reality device, a wireless USB flash, a Bluetooth speaker/headset, a factory-installed vehicle component, an event data recorder, or a security device.

Figure 1:
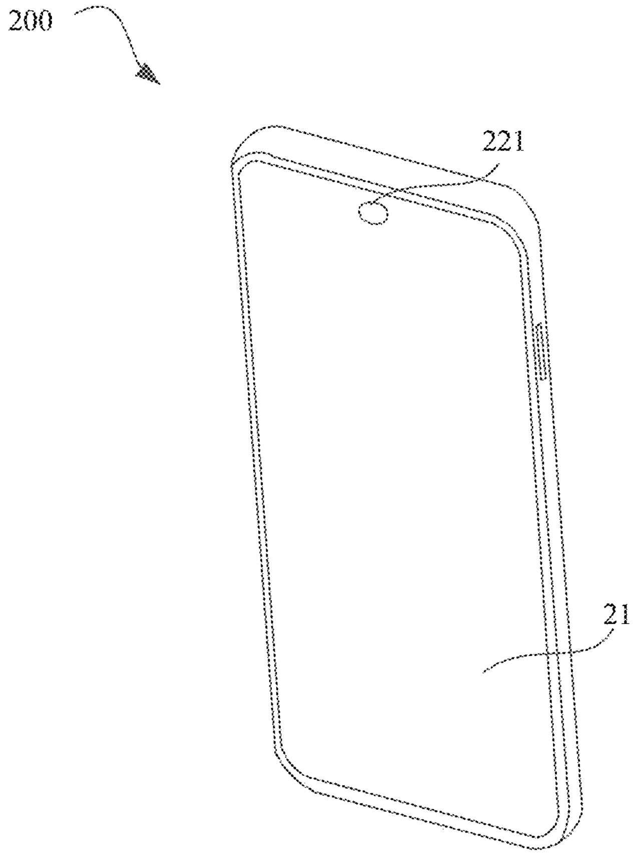
FIG. 1 is a schematic diagram of an overall structure of an electronic device according to an embodiment of this application.
Figure 2:
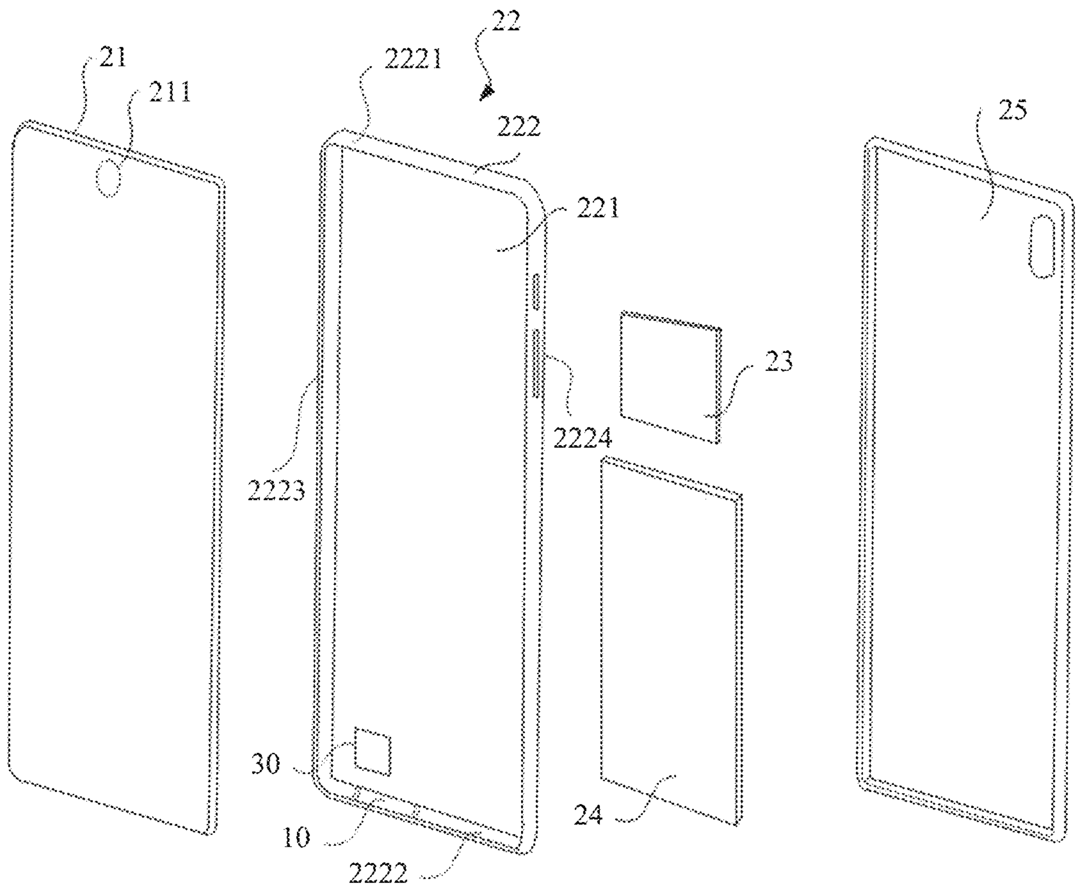
FIG. 2 is a schematic diagram of a split structure of an electronic device according to an embodiment of this application.

In an embodiment of this application, an example in which a mobile phone 200 is the foregoing electronic device is used for description. The mobile phone 200 provided in the embodiment of this application may be a curved screen mobile phone or a flat screen mobile phone. In the embodiment of this application, the flat screen mobile phone is used as an example for description. FIG. 1 and FIG. 2 respectively show an overall structure and a split structure of the mobile phone 200. A display 21 of the mobile phone 200 provided in this embodiment of this application may be a waterdrop screen, a notch screen, a full screen, or a punch-hole screen (as shown in FIG. 1). For example, the display 21 is provided with an opening 211. The following is described by using the punch-hole screen as an example.

Referring to FIG. 2, the mobile phone 200 may include the display 21, a rear housing 25, and a middle frame 22 located between the display 21 and the rear housing 25. In addition, the mobile phone 200 may further include a battery 24, and the battery 24 is located between the middle frame 22 and the rear housing 25. The battery 24 may be disposed on a surface that is of the middle frame 22 and that faces the rear housing 25 (as shown in FIG. 2), or the battery 24 may be disposed on a surface that is of the middle frame 22 and that faces the display 21. For example, the surface that is of the middle frame 22 and that faces the rear housing 25 may include a battery compartment (not shown in the figure), and the battery 24 is mounted in the battery compartment.

In some other examples, the mobile phone 200 may further include a circuit board 23. The circuit board 23 may be disposed on the middle frame 22, for example, the circuit board 23 may be disposed on the surface that is of the middle frame 22 and that faces the rear housing 25 (as shown in FIG. 2), or the circuit board 23 may be disposed on the surface that is of the middle frame 22 and that faces the display 21. The display 21 and the rear housing 25 are respectively located on two sides of the middle frame 22.

The battery 24 may be connected to a charging management module and the circuit board 23 by using a power management module. The power management module receives an input of the battery 24 and/or an input of the charging management module, and supplies power to a processor, an internal memory, an external memory, the display 21, a camera module, a communication module, and the like. The power source management module may be further configured to monitor parameters such as a capacity of the battery 24, a cycle count of the battery 24, and a state of health (leakage or impedance) of the battery 24. In some other embodiments, the power management module may alternatively be disposed in a processor of the circuit board 23. In some other embodiments, the power management module and the charging management module may be disposed in a same component.

When the mobile phone 200 is a flat screen mobile phone, the display 21 may be an organic light-emitting diode (Organic Light-Emitting Diode, OLED) display, or may be a liquid crystal display (Liquid Crystal Display, LCD). When the mobile phone 200 is a curved screen mobile phone, the display 21 may be an OLED display.

Still referring to FIG. 2, the middle frame 22 may be a metal middle frame, the metal middle frame may include at least a metal middle plate 221 and a metal border frame 222, and the border frame 222 is disposed around an outer periphery of the metal middle plate 221 for one cycle. Generally, the border frame 222 may include a top border frame 2221, a bottom border frame 2222, a left border frame 2223, and a right border frame 2224, and the top border frame 2221, the bottom border frame 2222, the left border frame 2223, and the right border frame 2224 surround the frame 222 having a square ring structure. A material of the metal middle plate 221 includes, but is not limited to, an aluminum plate, aluminum alloy, stainless steel, a steel-aluminum composite die-casting plate, titanium alloy, magnesium alloy, or the like. The border frame 222 may be a metal border frame, a ceramic border frame, or a glass border frame. When the border frame 222 is the metal border frame, a material of the metal border frame includes, but is not limited to, aluminum alloy, stainless steel, a steel-aluminum composite die-casting plate, titanium alloy, or the like. The metal middle plate 221 may be connected to the border frame 222 through clamping, welding, bonding, or integral molding, or the metal middle plate 221 may be fixedly connected to the border frame 222 through injection molding.

Referring to FIG. 2, the top border frame 2221 is disposed opposite to the bottom border frame 2222, the left border frame 2223 is disposed opposite to the right border frame 2224, the top border frame 2221 is separately connected to one end of the left border frame 2223 and one end of the right border frame 2224 at a rounded corner, and the bottom border frame 2222 is separately connected to the other end of the left border frame 2223 and the other end of the right border frame 2224 at a rounded corner, to jointly form a round-cornered rectangular region. A surface that is of a rear housing and that is grounded is disposed in the round-cornered rectangular region, and is separately connected to the top border frame 2221, the bottom border frame 2222, the left border frame 2223, and the right border frame 2224. It may be understood that the surface that is of the rear housing and that is grounded may be the rear housing 25 of the mobile phone 200.

The rear housing 25 may be a metal rear housing, a glass rear housing, a plastic rear housing, or a ceramic rear housing. In the embodiment of this application, a material of the rear housing 25 is not limited, and is not limited to the foregoing examples either.

It should be noted that, in some examples, the rear housing 25 of the mobile phone 200 may be connected to the border frame 222 to form a unibody (Unibody) rear housing. For example, the mobile phone 200 may include the display 21, the metal middle plate 221, and a rear housing. The rear housing may be a unibody (Unibody) rear housing including the border frame 222 and the rear housing 25. In this way, the circuit board 23 and the battery 24 are located in space surrounded by the metal middle plate 221 and the rear housing.

It may be understood that the structures illustrated in embodiments of this application do not constitute a specific limitation on the mobile phone 200. In some other embodiments of this application, the mobile phone 200 may include more or fewer components than those shown in the figure, or combine some components, or split some components, or have different component arrangements. The components shown in the figure may be implemented by hardware, software, or a combination of software and hardware.

To implement a communication function of the mobile phone 200, an antenna may be disposed on the mobile phone 200, to transmit and receive signals through the antenna. An antenna performance level of the mobile phone 200 in an actual use scenario is directly related to actual user experience. Currently, most of the mobile phones 200 are industry design (Industry Design, ID) using a metal border frame and glass rear housing. A size of the metal border frame is limited and an antenna environment is limited. In a plurality of frequency bands of the antenna, based on a relationship between a frequency band and wavelength resonance, the lower the frequency is, the longer the required radiator is, and the greater the space requirement is. Therefore, how to improve antenna performance, especially low-frequency antenna performance, in a limited space environment and a radiator length, has become an important problem in research and design of a terminal antenna.

Figure 3:
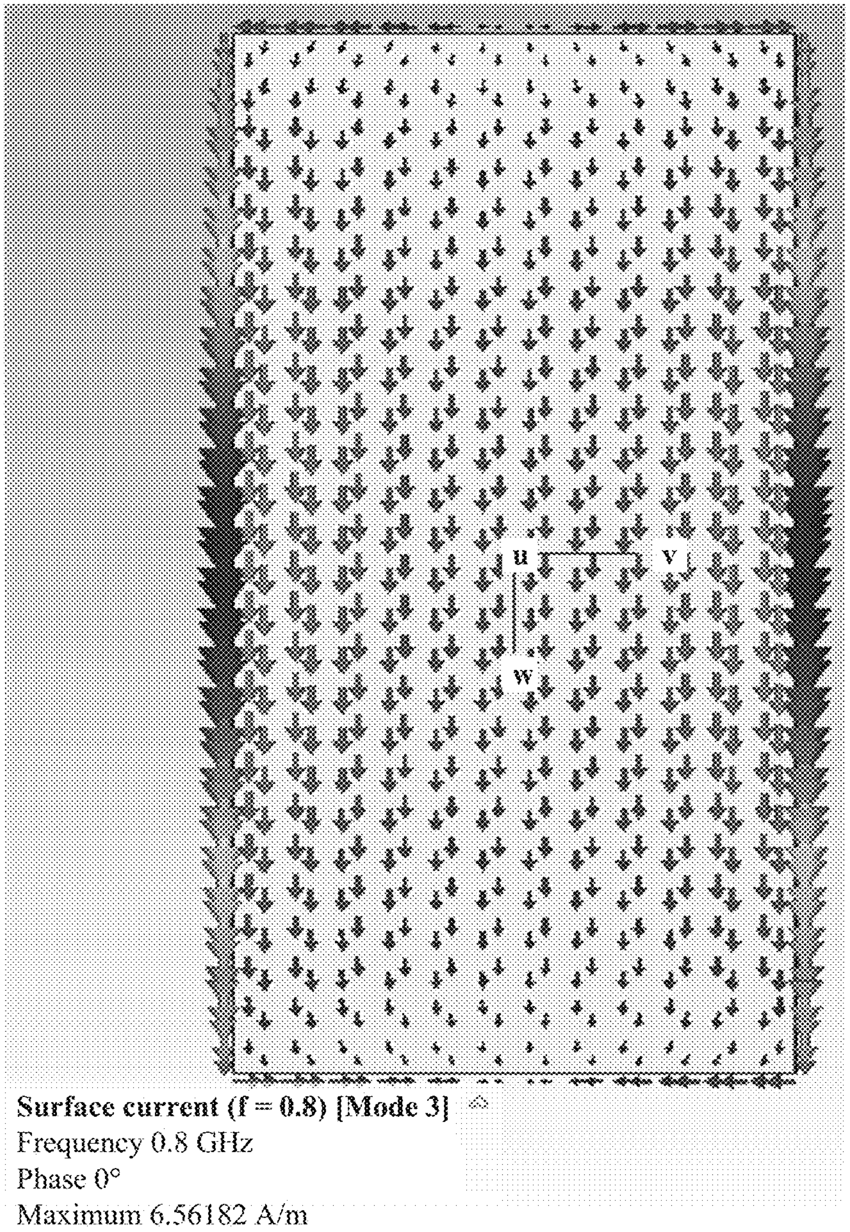
FIG. 3 is a diagram of a current distribution of a floor characteristic mode of an antenna of an electronic device in a conventional technology at 0.8 GHz.
Figure 4:
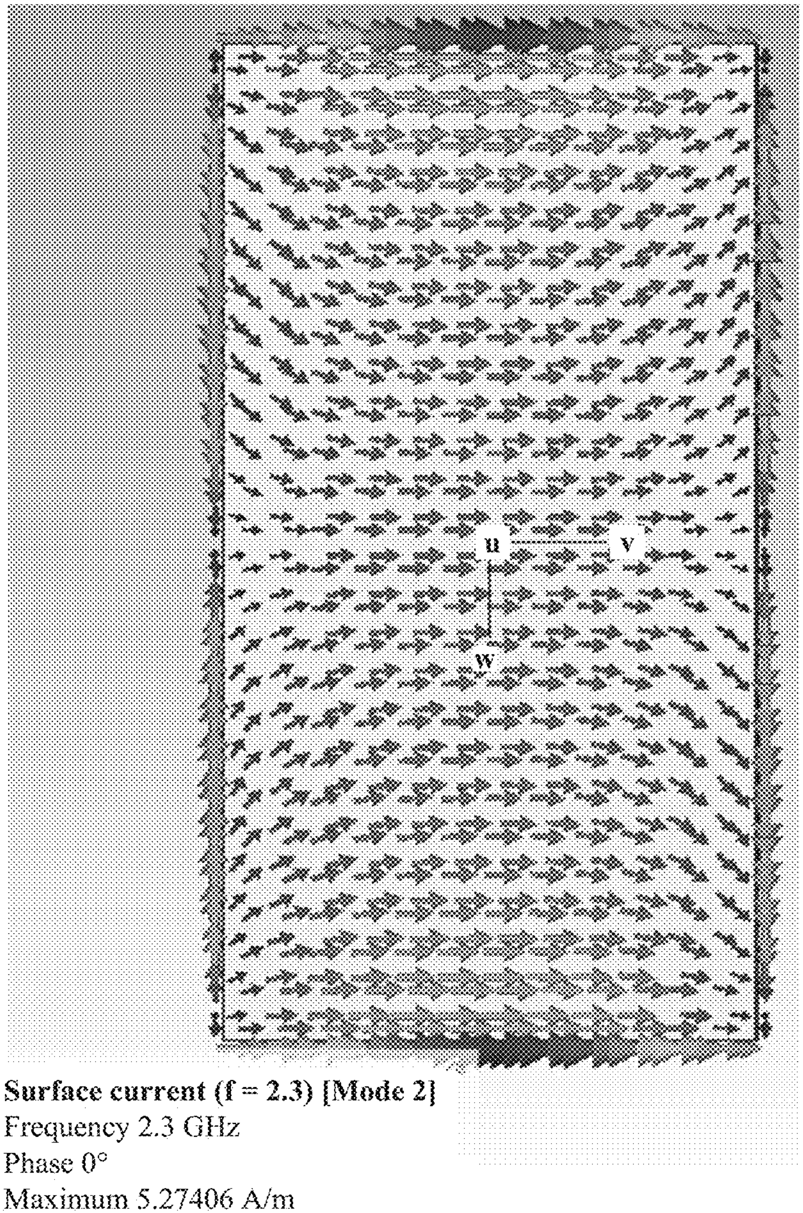
FIG. 4 is a diagram of a current distribution of a floor characteristic mode of an antenna of an electronic device in a conventional technology at 2.3 GHz.

A theory of a characteristic mode is a very important theory during design of the antenna. FIG. 3 and FIG. 4 show current distributions of a floor characteristic mode of the antenna. It may be learned from the figures that due to resonance, the floor (that is, the metal middle plate 221) has different current distribution on different frequency bands, that is, the floor characteristic modes of a low-frequency antenna and a medium-high-frequency antenna on different frequency bands have respective characteristics. A current flow direction of the low-frequency antenna is in a longitudinal mode (as shown in FIG. 3), and a current flow direction of the medium-high-frequency antenna is in a transverse mode (as shown in FIG. 4). A characteristic mode of the floor is an inherent characteristic of the floor. Based on a frequency requirement, a required floor characteristic mode is excited, to obtain high antenna efficiency at a corresponding frequency. For example, for a low frequency antenna, high free space (FS) efficiency can be obtained by sufficiently exciting the floor longitudinal mode; and for a medium-high frequency antenna, high FS efficiency can also be obtained by sufficiently exciting the lateral mode.

Figure 5:
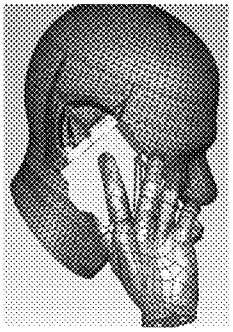
FIG. 5 is a schematic diagram of use of an electronic device in a besides head and hand scenario according to an embodiment of this application.

A conventional terminal antenna has many use scenarios. For example, common use scenarios include besides head and hand (besides head and hand, BHH), besides head (besides head, BH), and hand (hand, H). These scenarios are also common test scenarios for national authentication or operator admission. For example, FIG. 5 is a schematic diagram of a besides head and hand scenario. However, in these scenarios, the antenna performance changes compared with FS performance. For example, for FS of the low frequency antenna, a good floor longitudinal characteristic mode is needed when the antenna is designed, but the longitudinal characteristic mode in this case will result in great reduction in the hand. However, if the low-frequency antenna has a good floor transverse characteristic mode, small reduction in the hand may be obtained, and hand performance is good, but the FS deteriorates in this case.

Through analysis, for the low frequency antenna, efficiency of the low frequency antenna is improved if the floor longitudinal characteristic mode is additionally assisted and excited. Similarly, for the medium-high frequency antenna, efficiency of the medium-high frequency antenna is improved if the floor transverse characteristic mode is additionally assisted and excited. Based on this, embodiments of this invention provide an antenna apparatus and an electronic device having the antenna apparatus. The antenna apparatus may be used in the electronic device (for example, the mobile phone 200). The antenna apparatus is provided with a non-resonant unit and a feed unit, to respectively feed a radiation unit and a non-resonant unit. Through feeding power distribution design, the non-resonant unit can assist in exciting the floor characteristic mode. In addition, since a size of the non-resonant unit is much smaller than an electrical length required for resonance of an antenna on this frequency band, the non-resonant unit does not generate a resonance curve on a resonance curve and has no resonance point, to improve radiation efficiency of the antenna without generating new resonance, so as to improve a use effect of a user.

It should be noted that the antenna apparatus provided in this application is used in an electronic device using any one or more of the following communication technologies, for example, a long term evolution (long term evolution, LTE) communication technology, a Wi-Fi communication technology, a 5G communication technology, a SUB-6G communication technology, and another communication technology in the future.

The following describes a specific structure of the antenna apparatus with reference to specific accompanying drawings (the following embodiments do not highlight a need for a communication network, and describe an operation characteristic of the antenna apparatus only based on a frequency).

Figure 6:
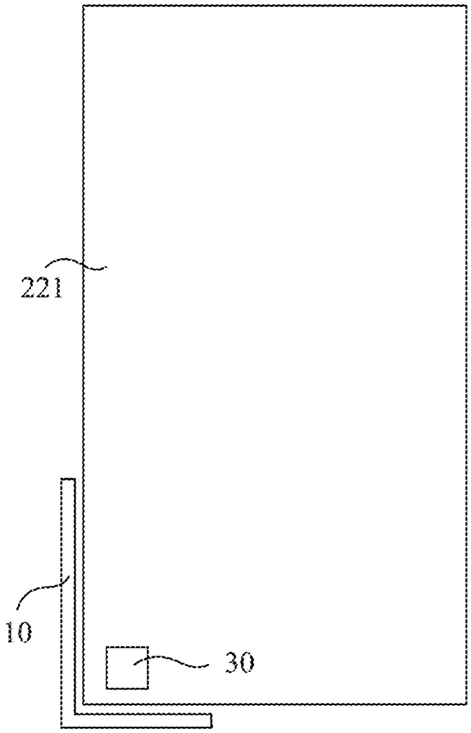
FIG. 6 is a schematic diagram of a structure of an antenna apparatus in an electronic device according to an embodiment of this application.
Figure 7:
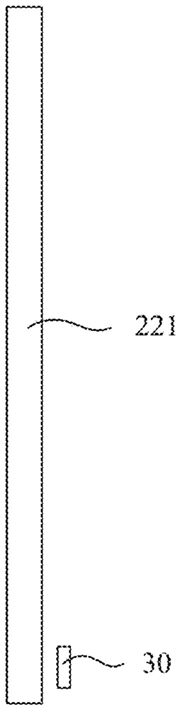
FIG. 7 is a schematic diagram of a structure of an antenna apparatus in an electronic device according to an embodiment of this application.
Figure 8:
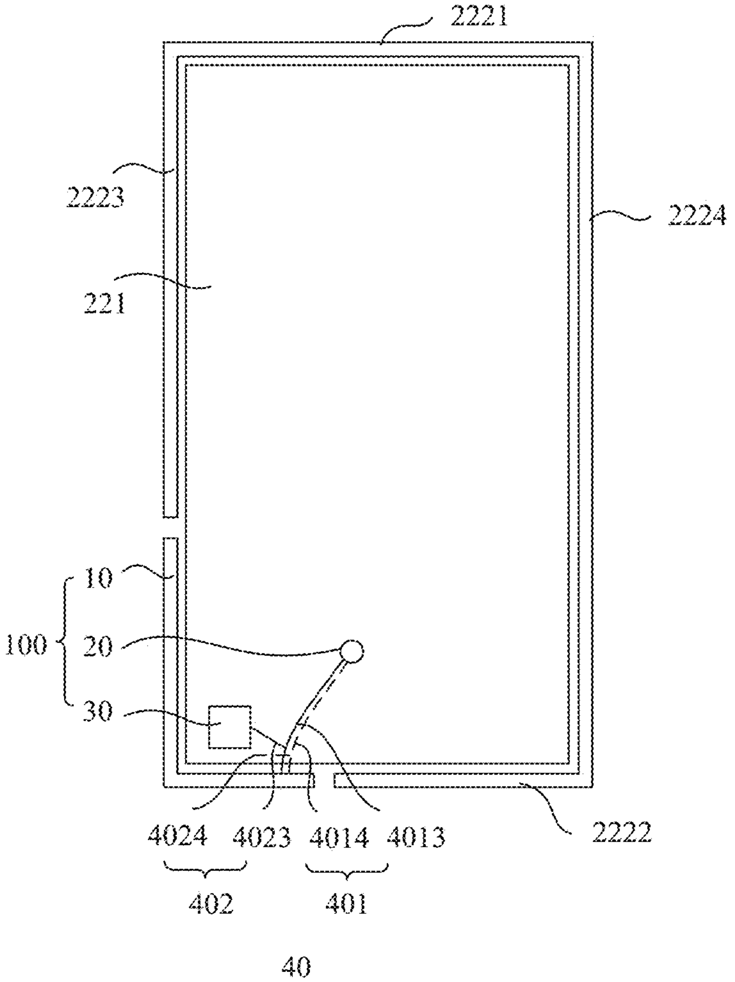
FIG. 8 is a schematic diagram of a structure of an antenna apparatus in an electronic device according to an embodiment of this application.

As shown in FIG. 6 to FIG. 8, an embodiment of this application provides an antenna apparatus 100. The antenna apparatus 100 is used in a mobile phone 200. The mobile phone 200 may include a display 21, a rear housing 25, and a middle frame 22 (referring to FIG. 2) located between the display 21 and the rear housing 25. The antenna apparatus 100 may include at least one radiation unit 10, at least one feed unit 20, and at least one non-resonant unit 30, and the feed unit 20 separately feeds the radiation unit 10 and the non-resonant unit 30.

A size of the non-resonant unit 30 may be less than ⅛λ, where λ is a wavelength corresponding to a resonance frequency of the radiation unit 10. It should be noted that the size of the non-resonant unit 30 is much smaller than an electrical length required for resonance of the radiation unit 10 on this frequency band, to ensure that the non-resonant unit 30 does not generate a resonance curve on a reflection coefficient curve (S11) and has no resonance point. Therefore, even if the non-resonant unit 30 is removed, the resonance curve and a quantity of resonance points on S11 do not change.

For example, as shown in FIG. 6, the size of the non-resonant unit size 30 may be 8 mm×9 mm, which is less than a resonant length of the radiation unit 10 on this frequency band. A ¼ wavelength at a low frequency is 75 mm @1 GHz. It may be understood that the non-resonant unit 30 may be a metal layer or may be a border frame metal branch, and this is not limited in this embodiment of this application, and is not limited to the foregoing example either.

In this embodiment of this application, a border frame 222 may be a metal border frame, the metal border frame may form a metal border frame antenna, and the metal border frame antenna is used as the at least one radiation unit 10 in the antenna apparatus 100. Specifically, the metal border frame antenna may be a radiator located on the metal border frame, and the radiator is formed by opening a slot in the metal border frame, in other words, the metal border frame antenna is a slot antenna formed by slotting in the metal border frame. The slot antenna may include a first part, a second part, and a third part separated by slots, and a non-conductive material may be filled between the first part and the second part, between the second part and the third part, and between the third part and the first part.

In an actual application, positions of the slots may be varied as required, and the slots may be filled with a non-conductive material (such as plastic), to ensure integrity of the metal border frame in appearance. By flexibly providing opening positions of the slots on the metal border frame, appearance design with different requirements may be implemented while ensuring radiation performance of the antenna, thereby improving product quality of the mobile phone 200.

A feed point and a ground point of the feed unit 20 may be respectively electrically connected to the non-resonant unit 30 and a metal middle plate 221 used as a floor in the mobile phone 200. It may be understood that the non-resonant unit 30 is configured to assist in exciting the floor characteristic mode, and the non-resonant unit 30 assists in exciting the floor longitudinal characteristic mode when the radiation unit 10 is a low frequency radiation unit. The non-resonant unit 300 assists in exciting the floor transverse characteristic mode when the radiation unit 10 is a medium-high frequency radiation unit.

A current flow direction of the low-frequency radiation unit is in a longitudinal mode, and a current flow direction of the medium-high frequency radiation unit is in a transverse mode, so that high antenna efficiency at a corresponding frequency can be obtained by exciting a required floor characteristic mode. That is, for the low-frequency radiation unit, high radiation efficiency can be obtained by sufficiently exciting the floor longitudinal mode; and for the medium-high frequency radiation unit, high radiation efficiency can also be obtained by sufficiently exciting the transverse mode.

In a possible implementation, an orthographic projection that is of the non-resonant unit 30 and that is in a first direction L1 may be located in the metal middle plate 221, and the first direction L1 is the direction perpendicular to a plane in which the metal middle plate 221 is located. For example, the non-resonant unit 30 may be located above the metal middle plate 221, so that the feed unit 20 is separately connected to the non-resonant unit 30 and a floor (that is, the metal middle plate 221) below the non-resonant unit 30 through a power distribution of a feed connection, thereby assisting in exciting the floor characteristic mode.

As an optional implementation, the feed unit 20 may be electrically connected to the non-resonant unit 30 and the metal middle plate 221 by using a feed line 40. Through a line power distribution of the feed line 40 for the feed connection, the feed unit 20 is connected to each of the non-resonant unit 30 and the floor (that is, the metal middle plate 221) below the non-resonant unit 30 by using the feed line 40, thereby assisting in exciting the floor characteristic mode.

Figure 9:
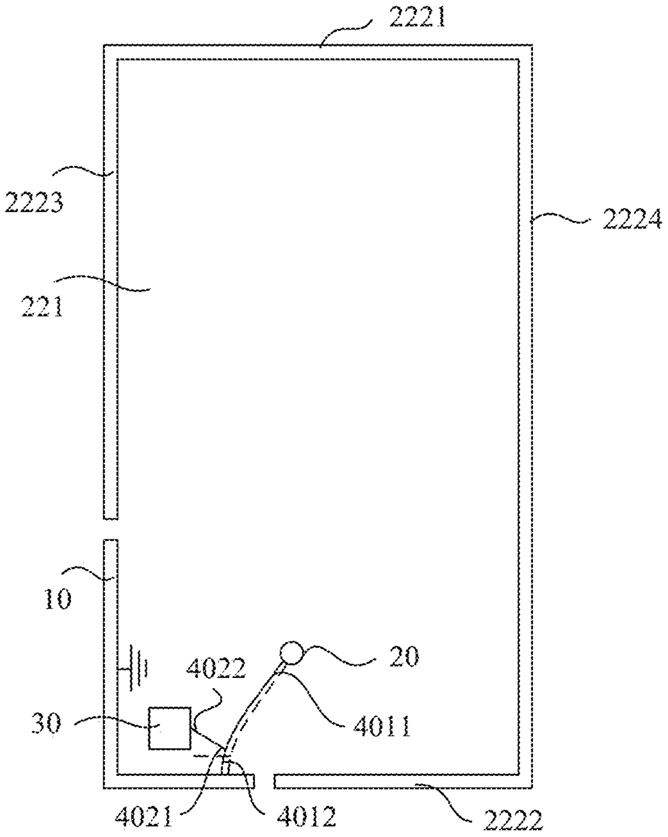
FIG. 9 is a schematic diagram of a structure of an antenna apparatus in an electronic device according to an embodiment of this application.

As shown in FIG. 8 and FIG. 9, each feed line 40 may include a main feed line 401 and a sub-feed line 402. The main feed line 401 and the sub-feed line 402 each include a signal line and a ground line. A signal line at a first end 4011 of the main feed line is electrically connected to the feed unit 20, a signal line at a second end 4012 of the main feed line is electrically connected to the radiation unit 10, and a ground line of the main feed line 401 is grounded. A signal line and a ground line at a first end 4021 of the sub-feed line are electrically connected to the signal line and the ground line of the main feed line 401, and a signal line and a ground line at a second end 4022 of the sub-feed line are electrically connected to the non-resonant unit 30 and the metal middle plate 221 respectively. In this way, the feed unit 20 can separately feed the radiation unit 10 and the non-resonant unit 30, and efficiency of the antenna can be effectively improved through a power distribution at a feed location and a connection to the non-resonant unit 30 and the floor (that is, the metal middle plate 221) at the non-resonant unit 30.

In a possible implementation, still referring to FIG. 8, the sub-feed line 402 may be a coaxial line. Specifically, the sub-feed line 402 may include an outer conductor 4024 and an inner conductor 4023, the outer conductor 4024 is wrapped outside the inner conductor 4023, the inner conductor 4023 is the signal line of the sub-feed line 402, and the outer conductor 4024 is the ground line of the sub-feed line 402. One end of the inner conductor 4023 is electrically connected to the signal line of the main feed line 401, and the other end of the inner conductor 4023 is electrically connected to the non-resonant unit 30. One end of the outer conductor 4024 is electrically connected to the ground line of the main feed line 401, and the other end of the outer conductor 4024 is electrically connected to the metal middle plate 221. The inner conductor 4023 of the sub-feed line 402 is electrically connected to the non-resonant unit 30, and the outer conductor 4024 of the sub-feed line 402 is electrically connected to the floor (that is, the metal middle plate 221) at the non-resonant unit 30, so that while assisting in exciting the floor characteristic mode, the metal middle plate 221 connected to the outer conductor 4024 can provide a specific shielding effect for the non-resonant unit 30 connected to the inner conductor 4023.

In addition, as shown in FIG. 8, the main feed line 401 may be a microstrip line. Specifically, the main feed line 401 may include a first conductor 4013 and a second conductor 4014. The first conductor 4013 is the signal line of the main feed line 401, the second conductor 4014 is the ground line of the main feed line 401, and the first conductor 4013 is separated from the second conductor 4014. In this way, transmission of a power supply signal and a ground signal between the feed unit 20 and the radiation unit 10 can be ensured.

It should be noted that the first end 4011 of the main feed line may include a first end of the first conductor 4013 and a first end of the second conductor 4014. For ease of identification, in FIG. 9, the first end of the first conductor 4013 is used as an example to show the first end 4011 of the main feed line.

Figure 10:
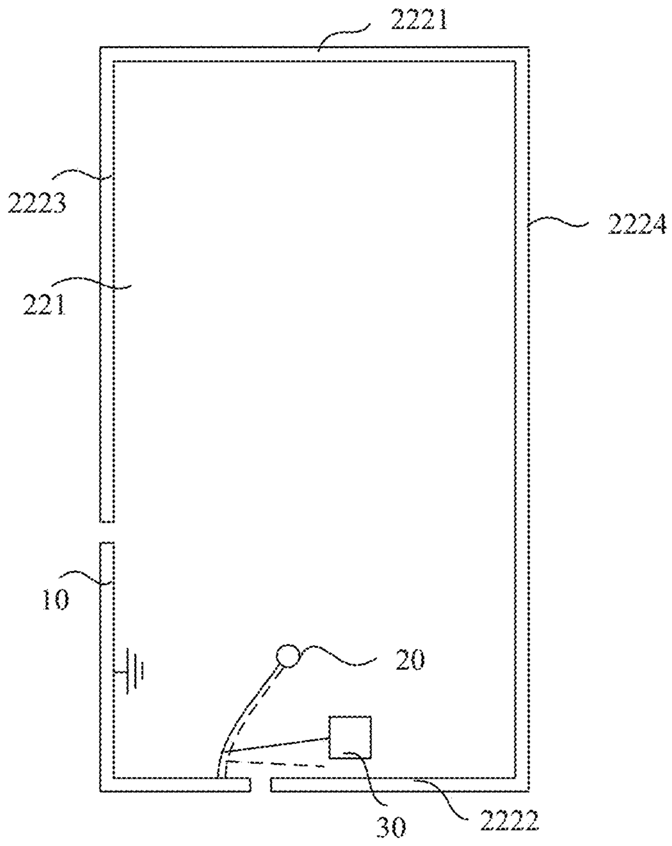
FIG. 10 is a schematic diagram of a structure of an antenna apparatus in an electronic device according to an embodiment of this application.
Figure 11:
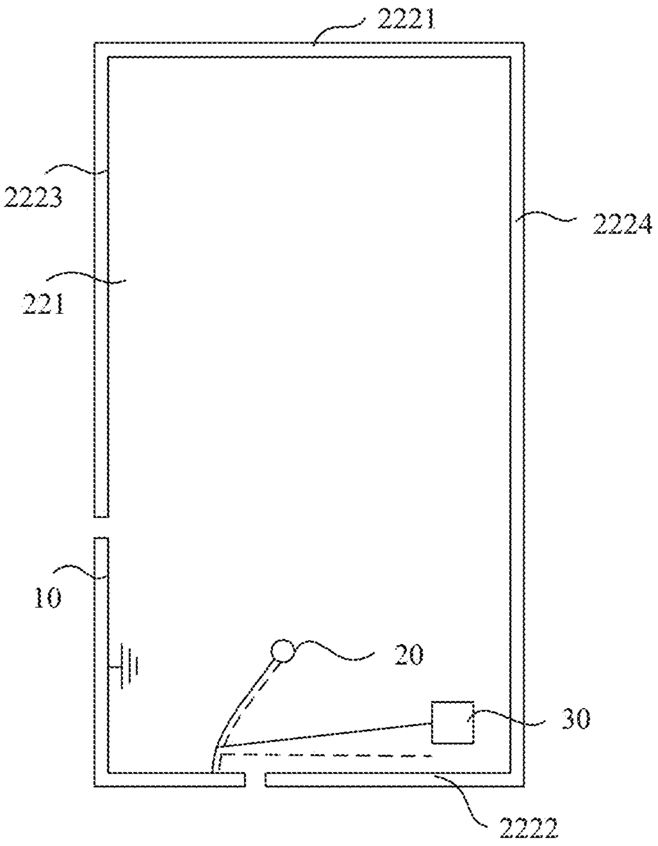
FIG. 11 is a schematic diagram of a structure of an antenna apparatus in an electronic device according to an embodiment of this application.

In this embodiment of this application, the non-resonant unit 30 may be disposed at a position as shown in FIG. 8, or may be disposed at a position as shown in FIG. 10 or FIG. 11. A specific position of the non-resonant unit 30 is not limited in this embodiment of this application, and is not limited to the forgoing example either. It should be noted that the radiation unit 10 may be a low-frequency radiation unit.

Figure 12:
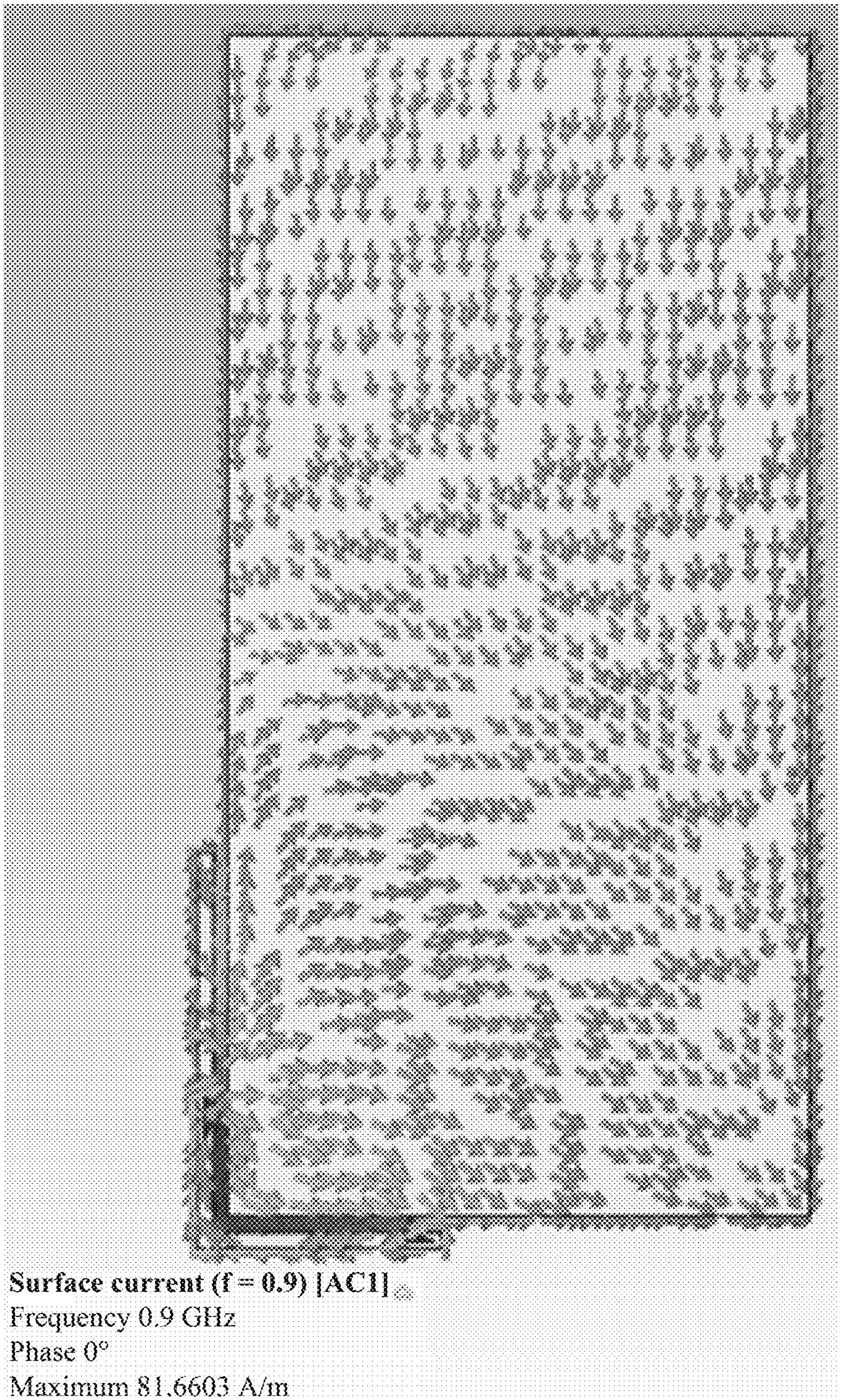
FIG. 12 is a diagram of a current distribution of a floor characteristic mode of an antenna of an electronic device at 0.9 GHz in a conventional technology.
Figure 13:
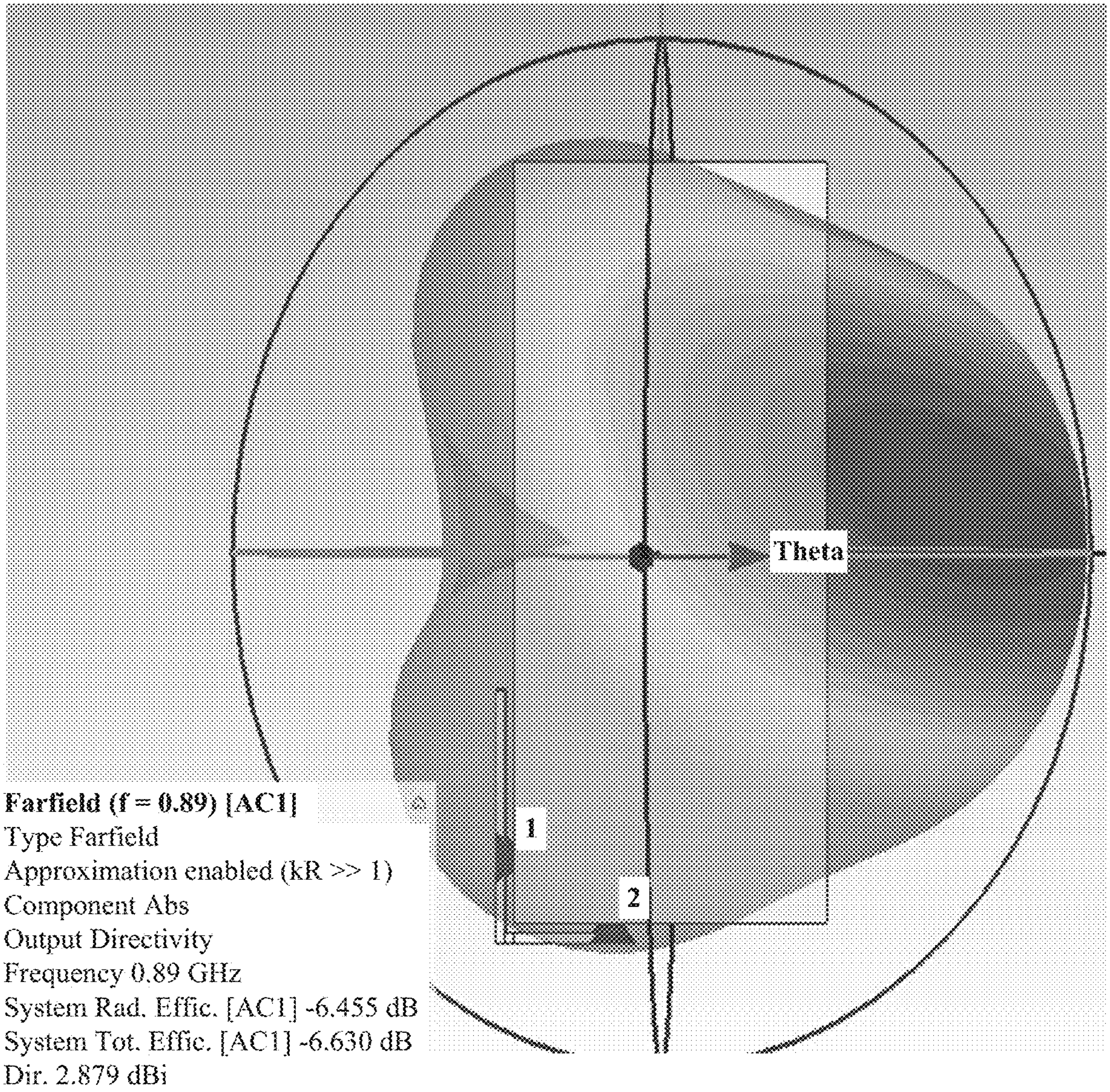
FIG. 13 shows a radiation pattern of an antenna of an electronic device at 0.89 GHz in a conventional technology.
Figure 14:
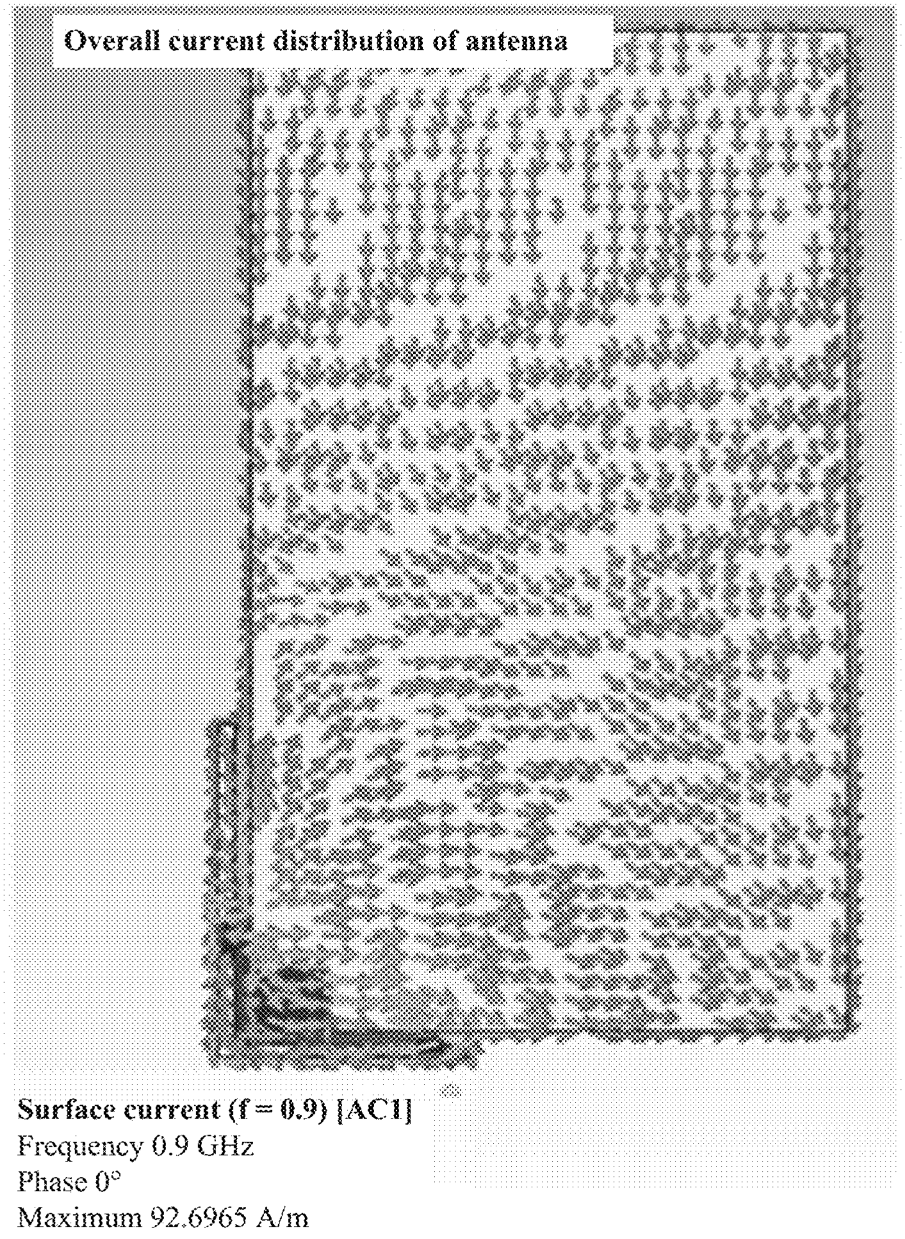
FIG. 14 is a diagram of a current distribution of a floor characteristic mode of an antenna apparatus in an electronic device at 0.9 GHz according to an embodiment of this application.
Figure 15:
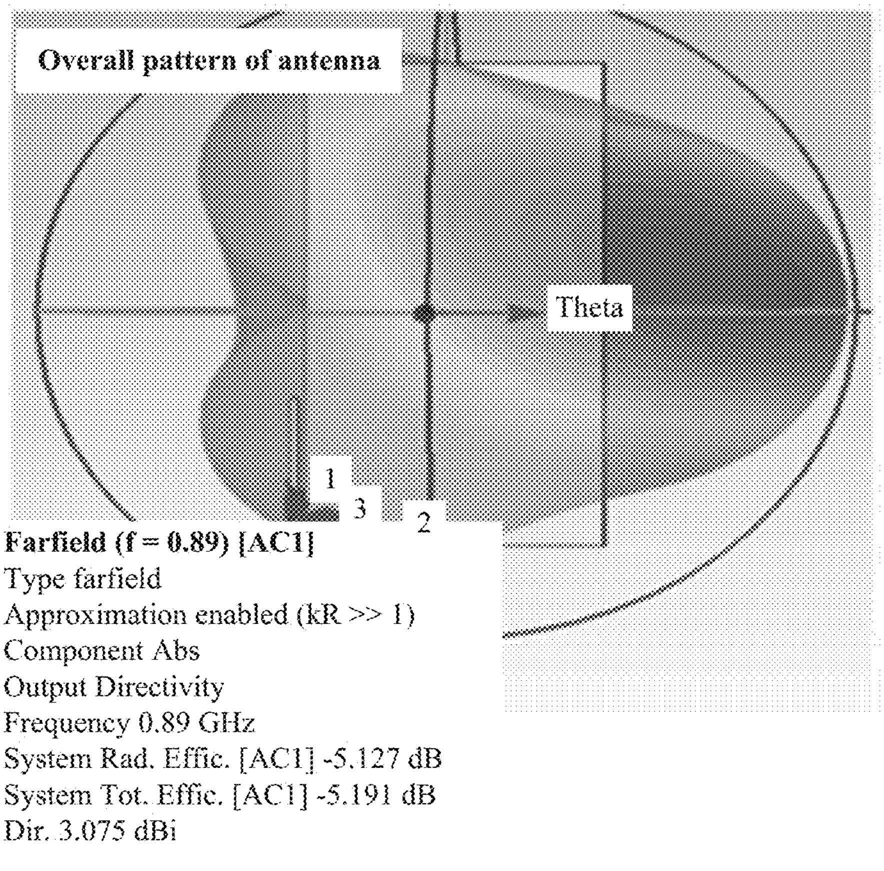
FIG. 15 shows a radiation pattern of an antenna apparatus in an electronic device at 0.89 GHz according to an embodiment of this application.
Figure 16:
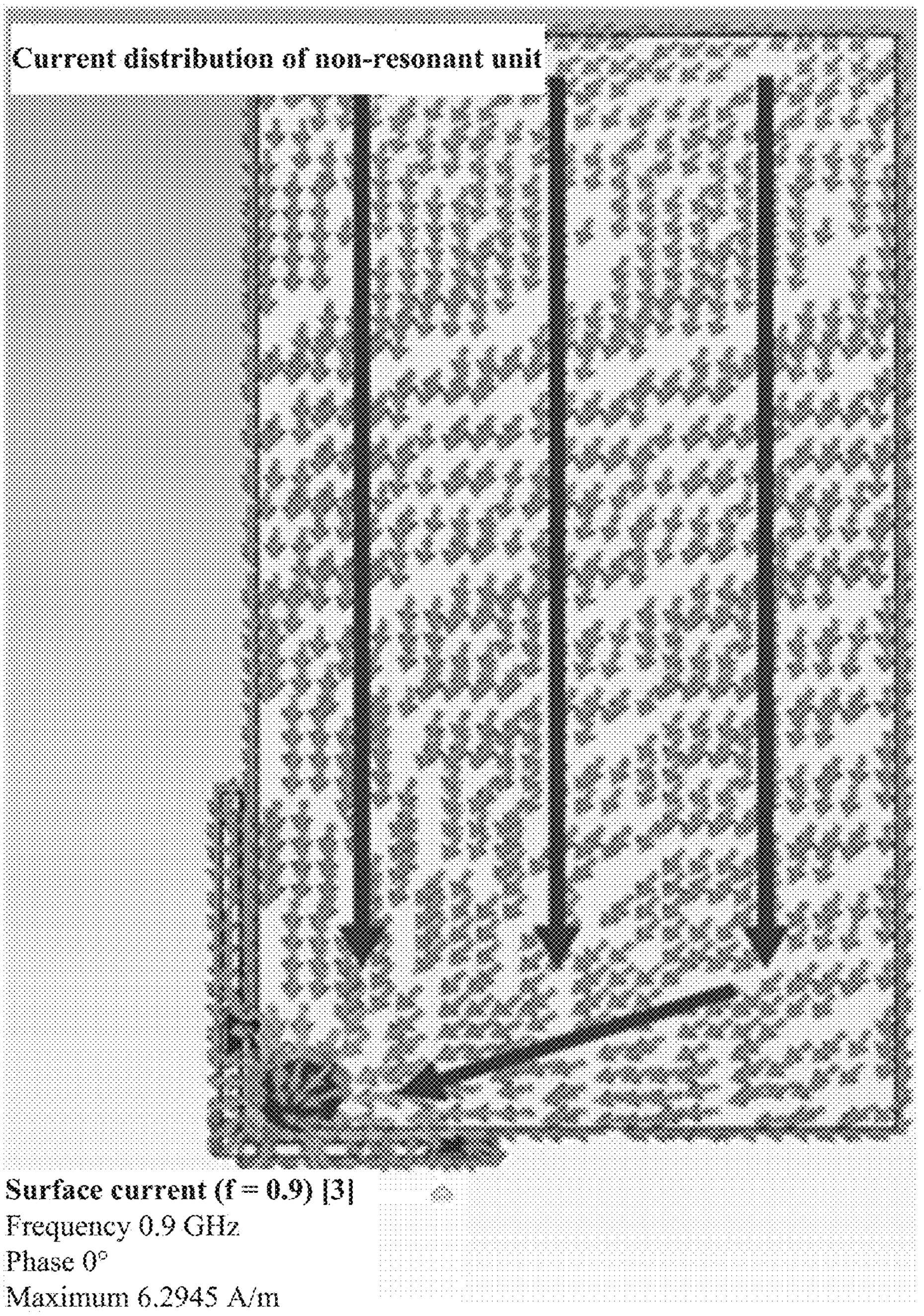
FIG. 16 is a diagram of a current distribution of a floor characteristic mode of a non-resonant unit of an antenna apparatus in an electronic device at 0.9 GHz according to an embodiment of this application.
Figure 17:
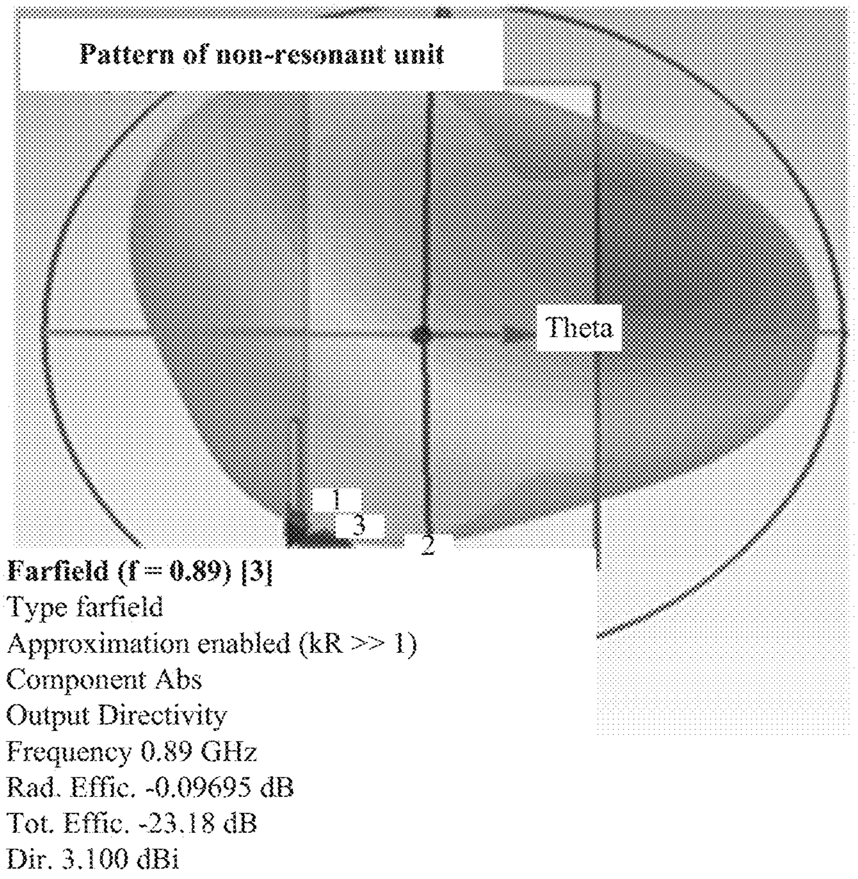
FIG. 17 shows a radiation pattern of a non-resonant unit of an antenna apparatus in an electronic device at 0.89 GHz according to an embodiment of this application.

FIG. 12 and FIG. 13 are respectively a diagram of a current distribution and a pattern of an antenna in a conventional technology. FIG. 14 and FIG. 15 are respectively a diagram of an overall current distribution and an overall pattern of an antenna apparatus 100 when a non-resonant unit 30 is introduced into the antenna apparatus 100 according to an embodiment of this application. FIG. 16 and FIG. 17 are respectively a diagram of a current distribution and a pattern of a non-resonant unit 30 introduced into an antenna apparatus 100 according to an embodiment of this application. Through comparison, it can be learned that the non-resonant unit 30 introduced into the antenna apparatus 100 in this embodiment of this application does not change the overall current distribution and pattern characteristic of the antenna apparatus 100, but the current distribution on the non-resonant unit 30 significantly excites the floor characteristic mode better, and excitation of such characteristic mode is beneficial for improving antenna efficiency.

Figure 18:
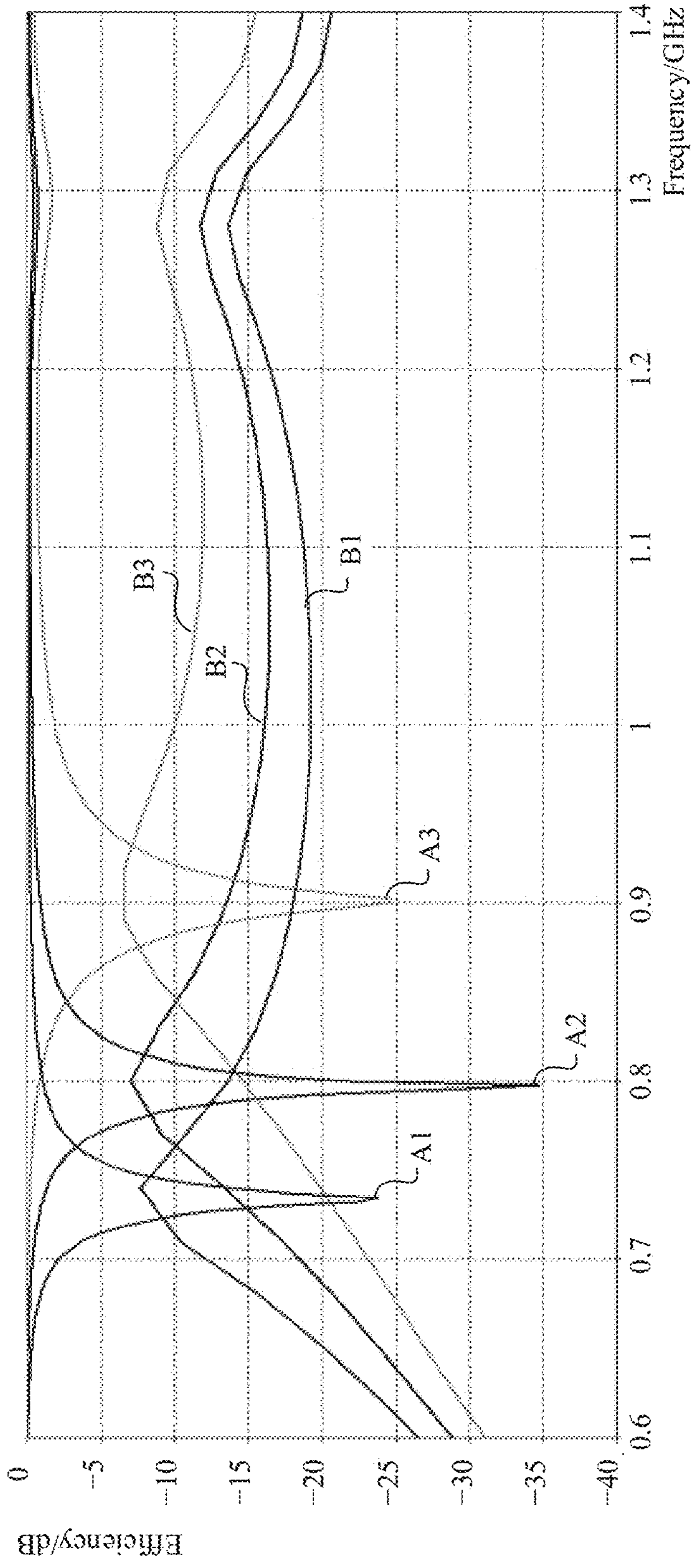
FIG. 18 shows a comparison of each of reflection coefficient curves and radiation efficiency curves of a low-frequency antenna of an electronic device on B28/B5/B8 in a conventional technology.

FIG. 18 shows a comparison of each of reflection coefficient curves and radiation efficiency curves of an antenna of an electronic device on B28/B5/B8 in a conventional technology. In FIG. 18, A1 is a reflection coefficient curve obtained by tuning an antenna on the B28 band, B1 is a radiation efficiency curve obtained by tuning the antenna on the B28 band, A2 is a reflection coefficient curve obtained by tuning an antenna on the B5 band, B2 is a radiation efficiency curve obtained by tuning the antenna on the B5 band, A3 is a reflection coefficient curve obtained by tuning an antenna on the B8 band, and B3 is a radiation efficiency curve obtained by tuning the antenna on the B8 band. A frequency band covered by B28 is 703 MHz to 748 MHz, a frequency band covered by B5 is 824 MHz to 849 MHz, and a frequency band covered by B8 is 880 MHz to 915 MHz.

Figure 19:
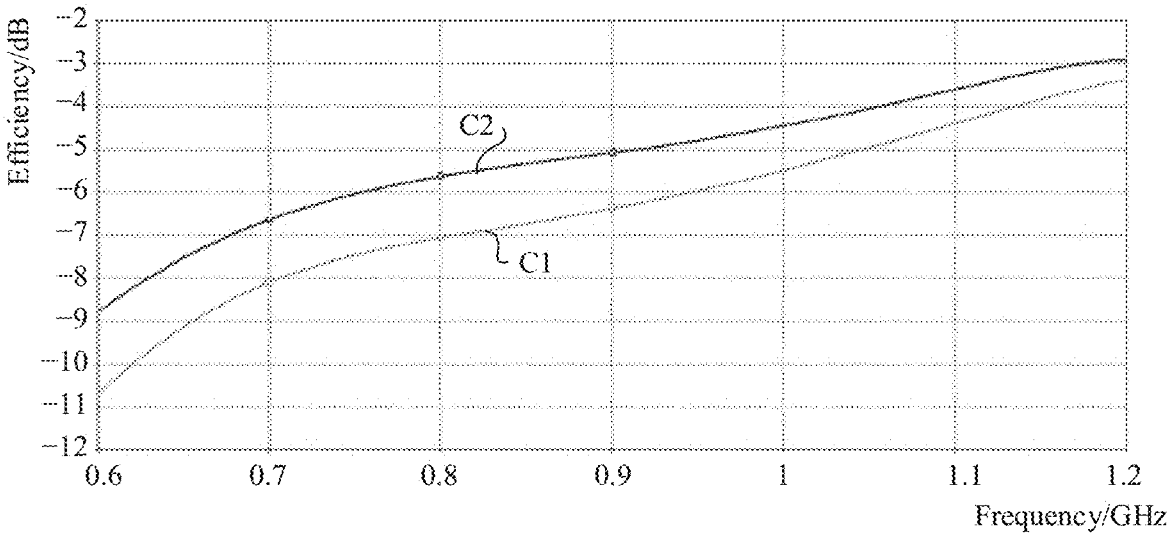
FIG. 19 shows a comparison of radiation efficiency on B5 of an antenna in a conventional technology and an antenna apparatus in an electronic device according to an embodiment of this application.
Figure 20:
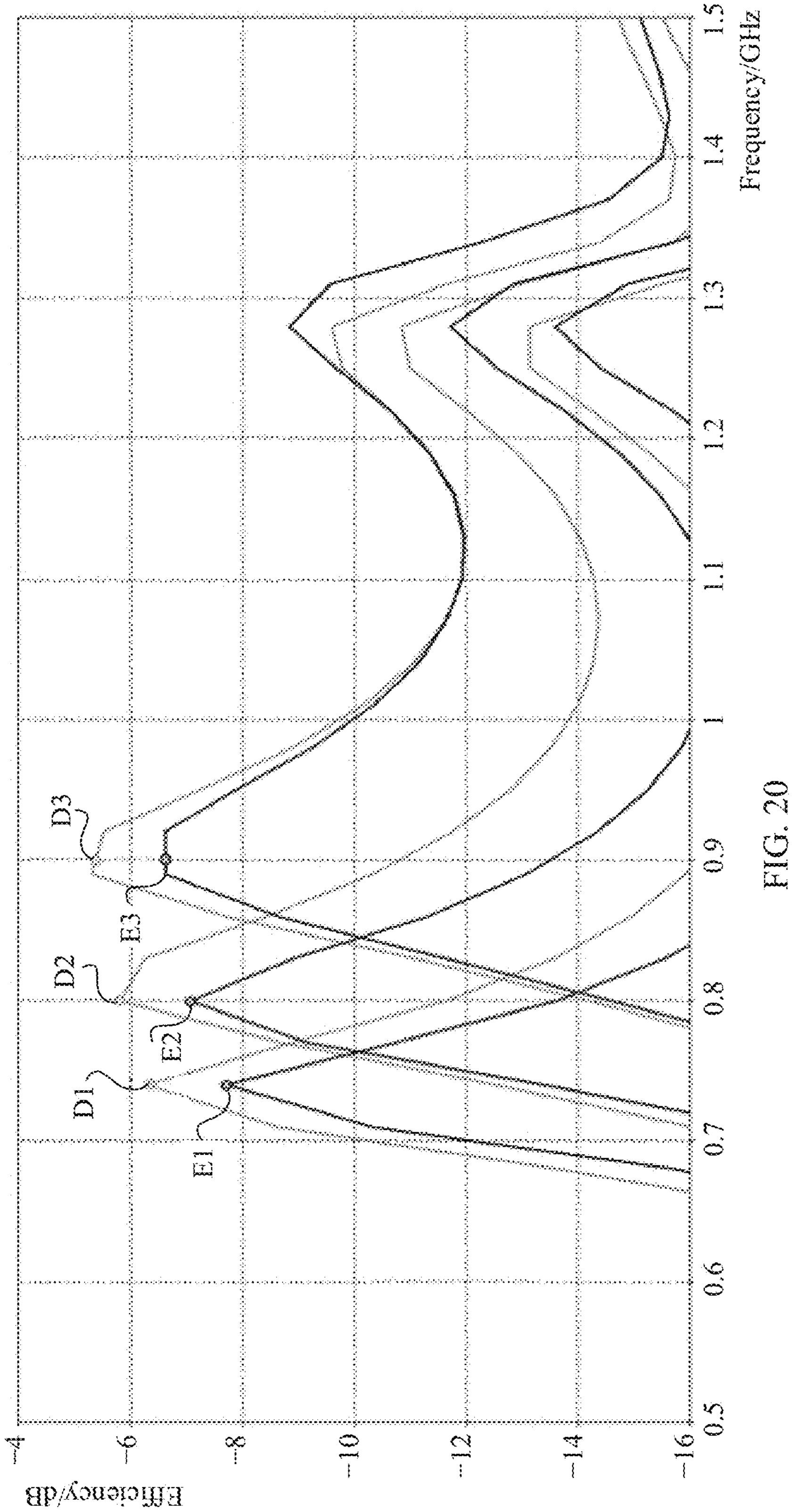
FIG. 20 shows a comparison of system total efficiency on B28/B5/B8 of an antenna in a conventional technology and an antenna apparatus in an electronic device according to an embodiment of this application.

FIG. 19 and FIG. 20 show a comparison of radiation efficiency and system efficiency of an antenna after a non-resonant unit 30 is introduced according to an embodiment of this application and radiation efficiency and system efficiency of an antenna without using a solution in an embodiment of this application. In FIG. 19, C1 is a radiation efficiency curve of an antenna in a conventional technology, and C2 is a radiation efficiency curve of an antenna apparatus 100 according to an embodiment of this application. In FIG. 20, D1 is a system efficiency curve when the antenna apparatus 100 in this embodiment of this application is on the B28 band, D2 is a system efficiency curve when the antenna apparatus 100 in this embodiment of this application is on the B5 band, D3 is a system efficiency curve when the antenna apparatus 100 in this embodiment of this application is on the B8 band, E1 is a system efficiency curve when the antenna in the conventional technology is on the B28 band, E2 is a system efficiency curve when the antenna in the conventional technology is on the B5 band, and E3 is a system efficiency curve when the antenna in the conventional technology is on the B8 band.

Through comparison, it may be apparently seen that the non-resonant unit 30 is introduced, so that antenna efficiency can be effectively improved through a power distribution at a feed location and a connection of the non-resonant unit 30 and the floor (the metal middle plate 221) at the non-resonant unit 30. Specifically, at 700 MHz, the radiation efficiency of the antenna apparatus 100 in this embodiment of this application is 1.5 dB higher than the radiation efficiency of the antenna in the conventional technology. At 800 MHz, the radiation efficiency of the antenna apparatus 100 in this embodiment of this application is 1.4 dB higher than the radiation efficiency of the antenna in the conventional technology. At 900 MHz, the radiation efficiency of the antenna apparatus 100 in this embodiment of this application is 1.3 dB higher than the radiation efficiency of the antenna in the conventional technology.

In addition, it should be noted that a result consistent with a simulation result can be obtained through debugging and verifying on an actual project. FIG. 8 is a schematic diagram of an experimental fixture for verifying on an actual project. In FIG. 8, the power distribution is performed at the feed location, the inner conductor 4023 of the feed line 40 is connected to the non-resonant unit 30, the outer conductor 4024 of the feed line 40 is connected to a middle frame of the floor at the non-resonant unit 30, and the non-resonant unit 30 may be a copper sheet of 10 mm×10 mm.

Figure 21:
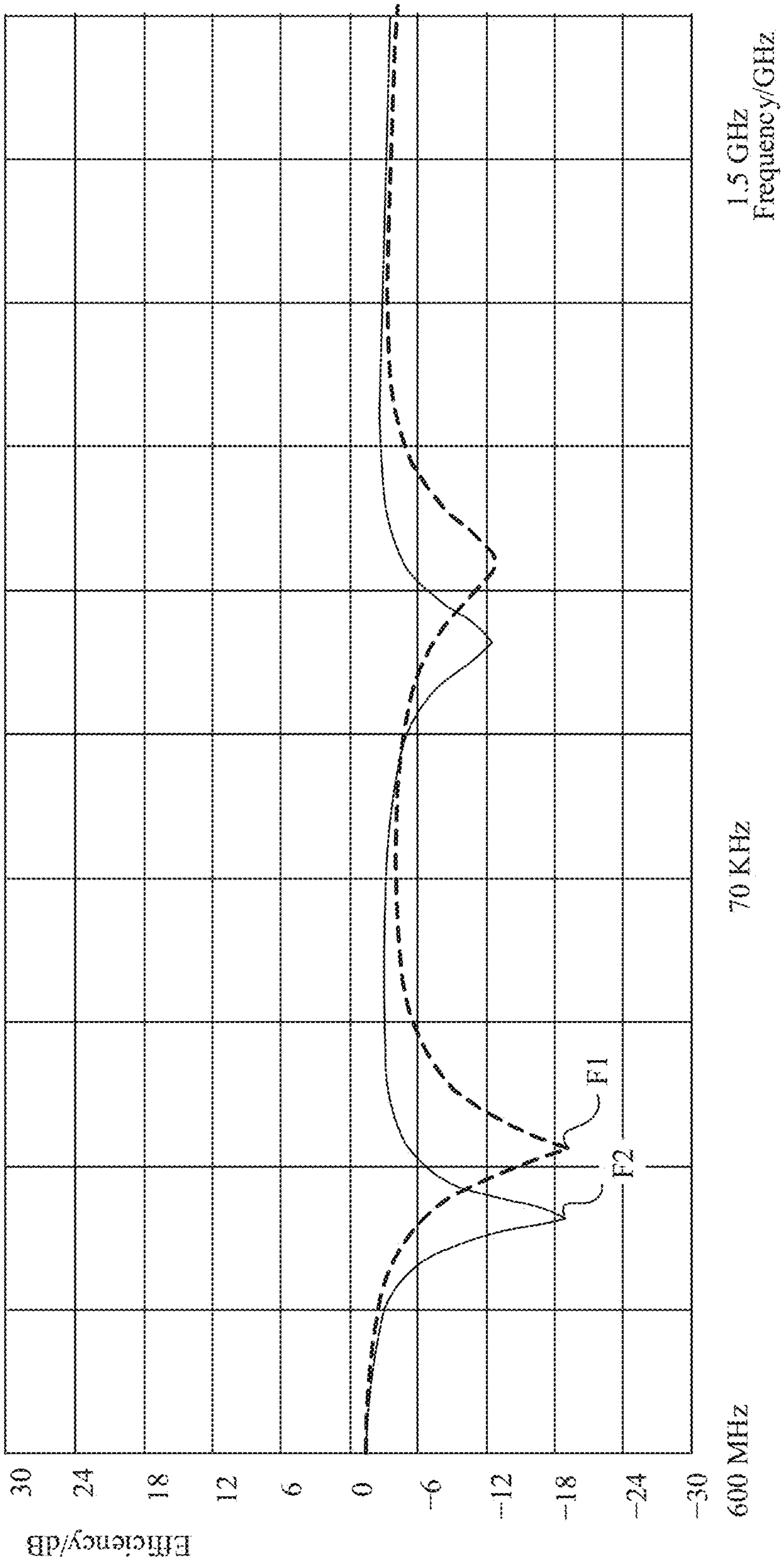
FIG. 21 shows a comparison of reflection coefficient curves of an antenna apparatus in an electronic device and an antenna in a conventional technology.
Figure 22:
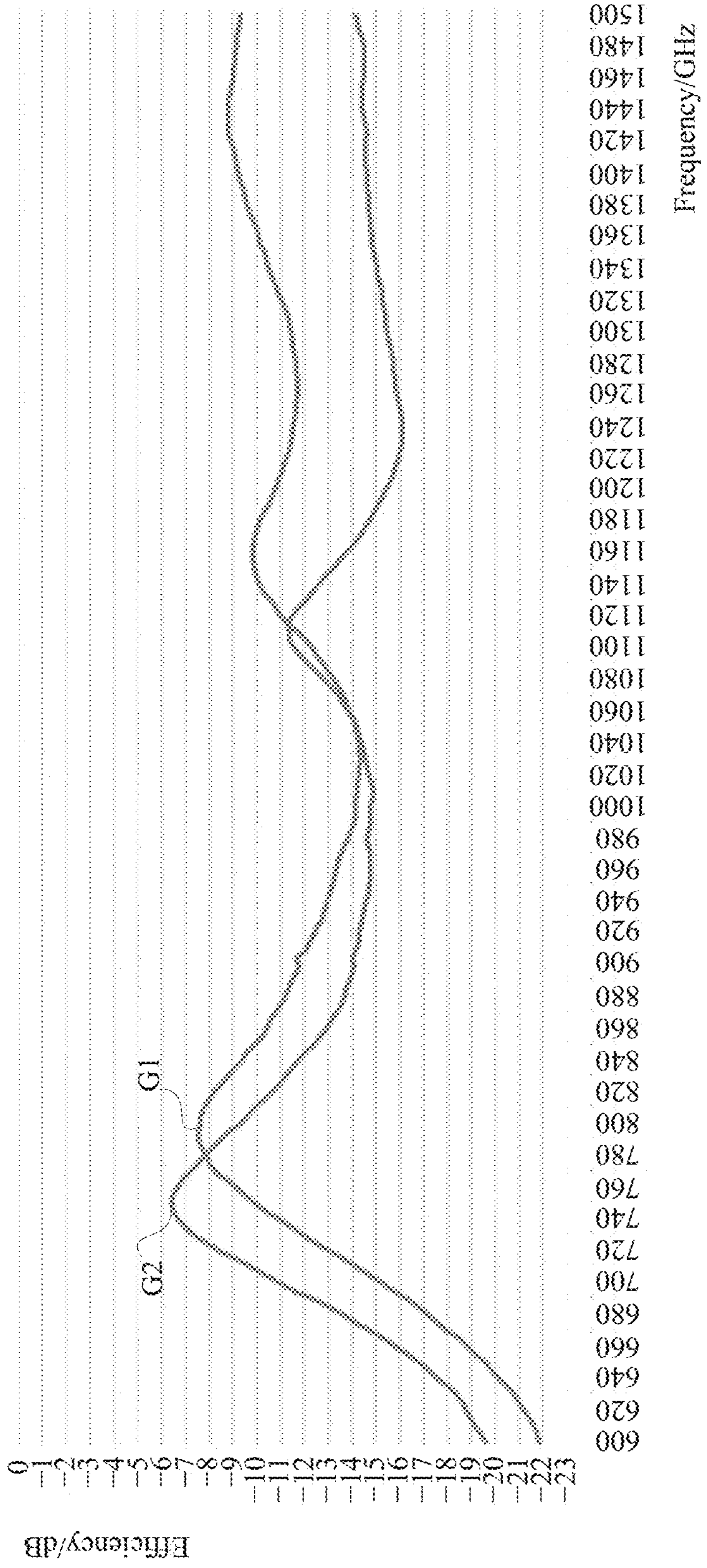
FIG. 22 shows a comparison of radiation efficiency of an antenna in a conventional technology and an antenna apparatus in an electronic device according to an embodiment of this application.

FIG. 21 and FIG. 22 respectively show a reflection coefficient curve and a radiation efficiency curve actually measured by an actual fixture. In FIG. 21, F1 is a reflection coefficient curve of an antenna in a conventional technology, and F2 is a reflection coefficient curve of an antenna apparatus 100 according to an embodiment of this application. In FIG. 22, G1 is a radiation efficiency curve of an antenna in a conventional technology, and G2 is a radiation efficiency curve of an antenna apparatus 100 according to an embodiment of this application. An actual measurement result shows that the non-resonant unit 30 introduced in this embodiment of this application can effectively improve the antenna efficiency without increasing resonance of S11. A frequency-deviation phenomenon occurring therein because a distributed capacitor of the non-resonant unit 30 and the middle frame of floor (the metal middle plate 221) is loaded to the feed location and cause capacitor loading, and this frequency deviation can be easily adjusted through tuning.

Figure 23:
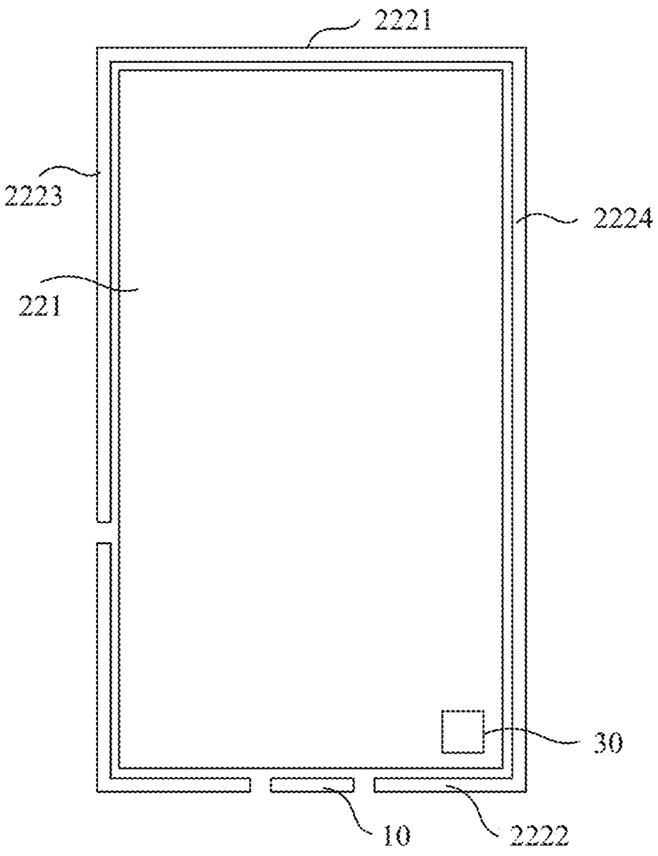
FIG. 23 is a schematic diagram of a structure of an antenna apparatus in an electronic device according to an embodiment of this application.
Figure 24:
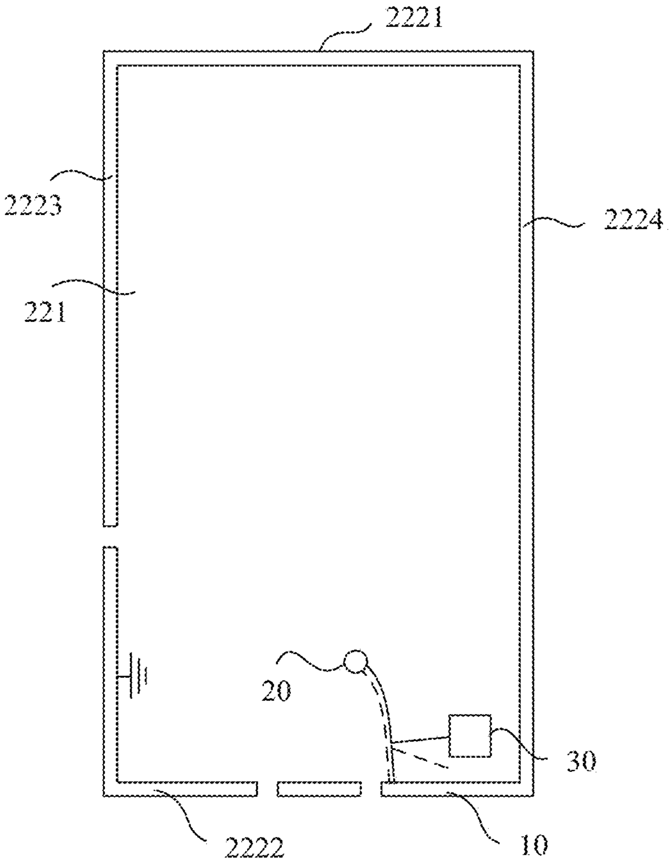
FIG. 24 is a schematic diagram of a structure of an antenna apparatus in an electronic device according to an embodiment of this application.
Figure 25:
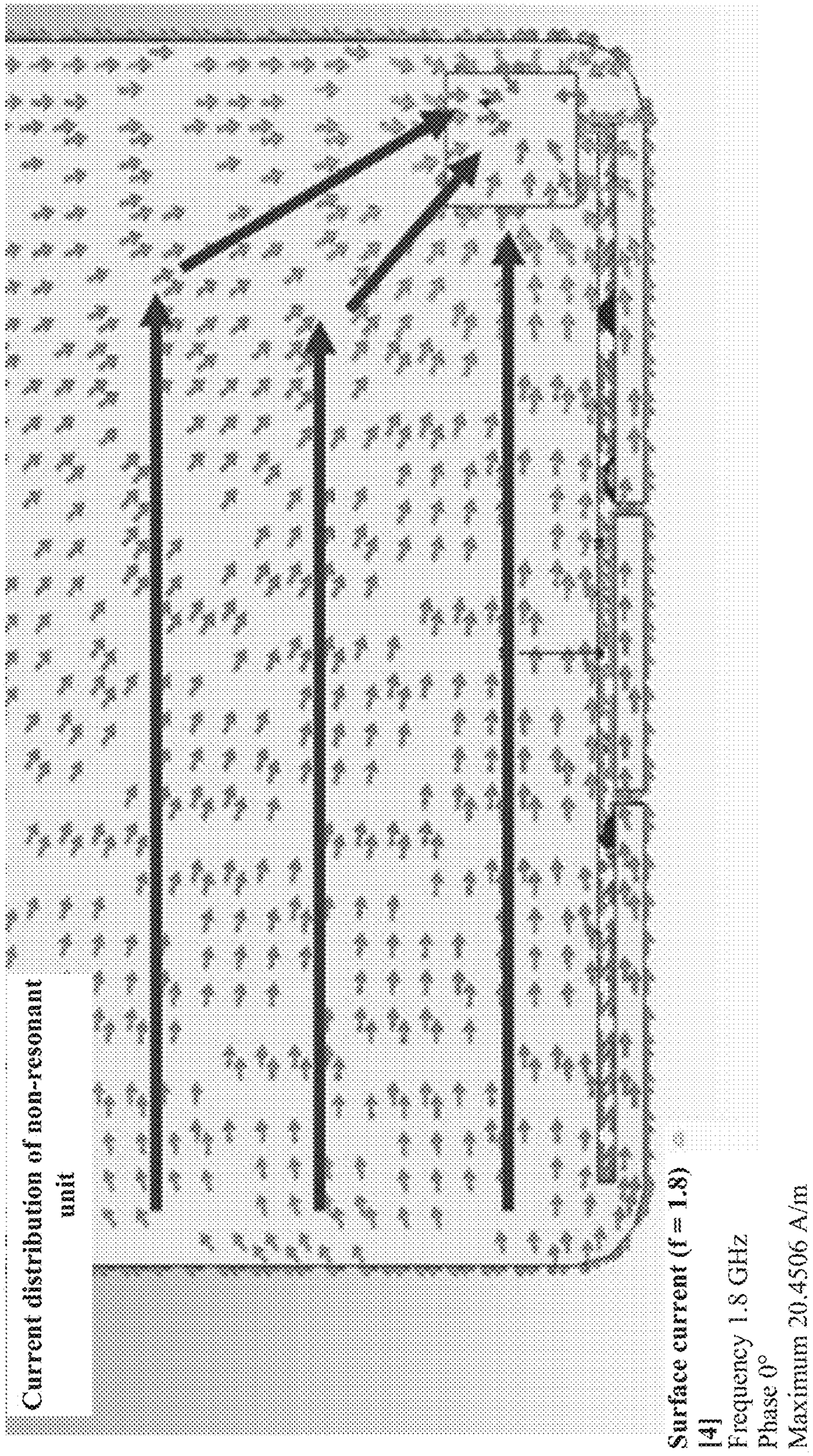
FIG. 25 is a diagram of a current distribution of a floor characteristic mode of an antenna apparatus in an electronic device at 1.8 GHz according to an embodiment of this application.

In addition, the method for improving the antenna efficiency by introducing the non-resonant unit to assist in exciting the floor characteristic mode mentioned in this invention patent can also be applied to a medium-high frequency antenna. As shown in FIG. 23 or FIG. 24, a non-resonant unit is added to the medium-high frequency antenna, and an excited floor characteristic mode current is shown in FIG. 25. The floor characteristic mode current assisted and excited by the non-resonant unit 30 is completely consistent with a medium-high frequency floor characteristic mode current shown in FIG. 4.

Figure 26:
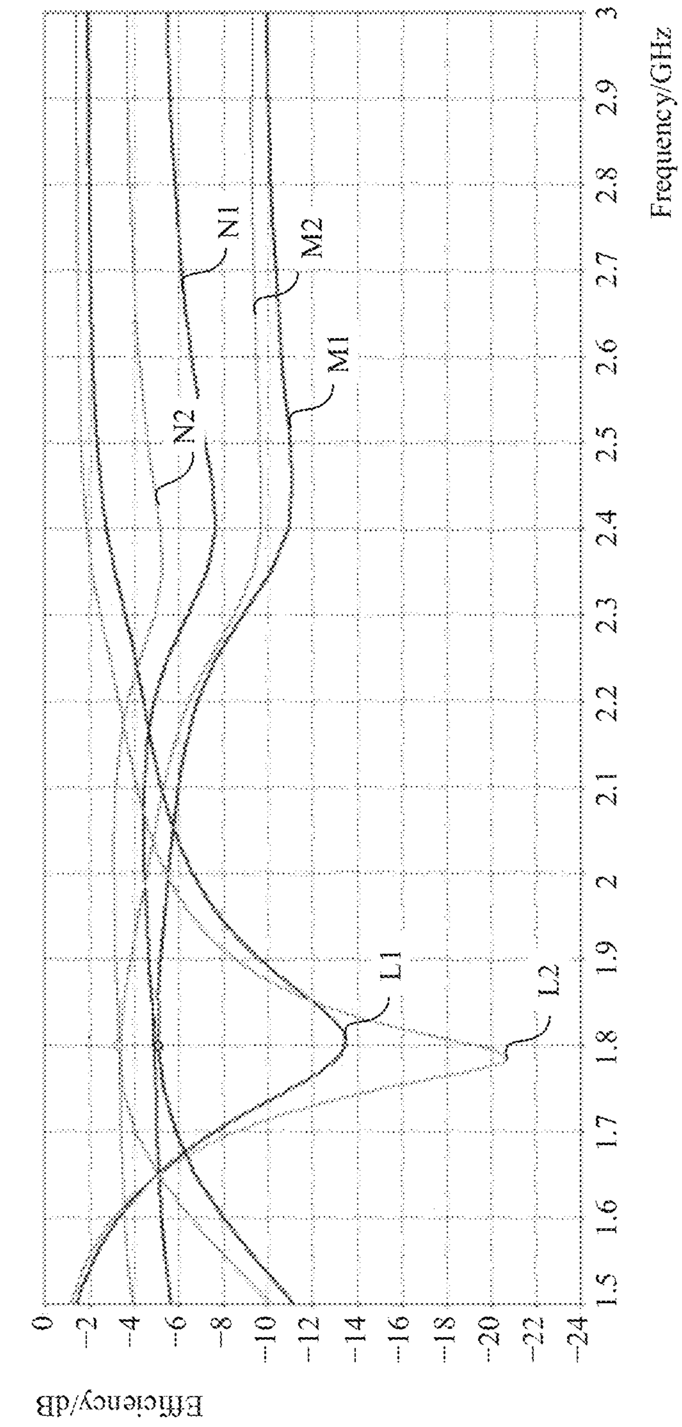
FIG. 26 shows a comparison of reflection coefficient curves, radiation efficiency curves, and system total efficiency of an antenna in a conventional technology and an antenna apparatus in an electronic device according to an embodiment of this application.

FIG. 26 shows a comparison of efficiency benefits of introducing a non-resonant unit 30 into an antenna apparatus 100 (that is, a structure shown in FIG. 23 or FIG. 24) according to an embodiment of this application. In FIG. 26, L1 is a reflection coefficient curve of an antenna in a conventional technology, L2 is a reflection coefficient curve of the antenna apparatus 100 according to an embodiment of this application, M1 is a radiation efficiency curve of the antenna in the conventional technology, M2 is a radiation efficiency curve of the antenna apparatus 100 according to an embodiment of this application, N1 is a system total efficiency curve of the antenna in the conventional technology, and N2 is a system total efficiency curve of the antenna apparatus 100 according to an embodiment of this application. It may be apparently seen from the efficiency curve, compared with the conventional technology, in the antenna apparatus 100 provided in this embodiment of this application, the antenna efficiency of the medium-high frequency can also be significantly improved, and the antenna efficiency can be improved by 1.7 dB at 1.8 GHz, thereby improving antenna performance.

It should be noted that, in this embodiment of this application, the radiation unit 10 may be a metal border frame antenna, and the non-resonant unit 30 may be disposed close to the metal border frame antenna. The non-resonant unit 30 is disposed close to the metal border frame antenna, so that a length of the feed line 40 can be reduced to some extent, thereby reducing costs and improving reliability.

Figure 27:
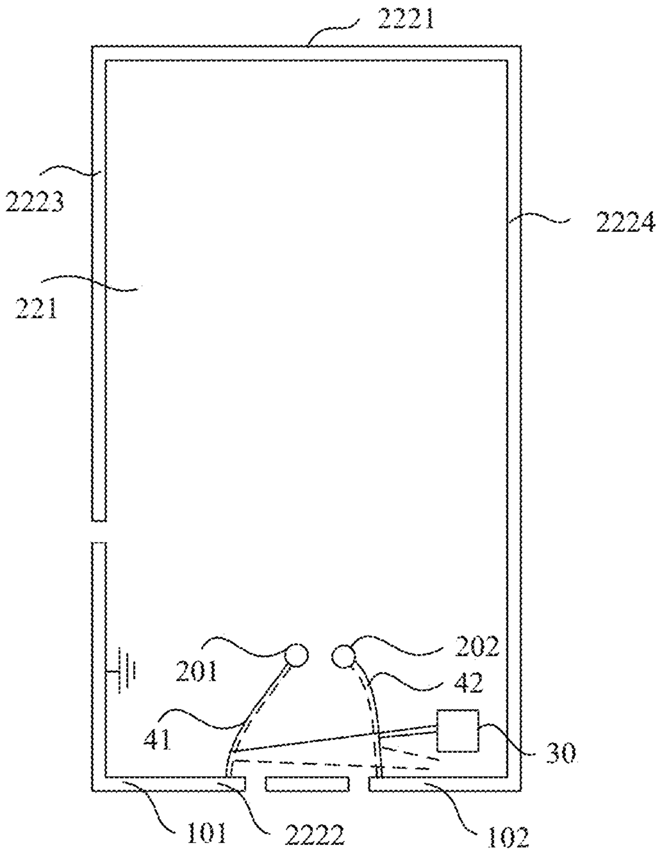
FIG. 27 is a schematic diagram of a structure of an antenna apparatus in an electronic device according to an embodiment of this application.

In addition, in some embodiments, a quantity of non-resonant units 30 is one, and a quantity of feed lines 40 may be at least two. As shown in FIG. 27, the at least one feed unit 20 may include a first feed unit 201 and a second feed unit 202. A feed point and a ground point of the first feed unit 201 may be electrically connected to the non-resonant unit 30 and the metal middle plate 221 by using a first feed line 41 of the at least two feed lines 40, and a feed point and a ground point of the second feed unit 202 may be electrically connected to the non-resonant unit 30 and the metal middle plate 221 by using a second feed line 42 of the at least two feed lines 40.

The at least one radiation unit 10 may include a first radiation unit 101 and a second radiation unit 102. The signal line at the first end 4011 of the main feed line of the first feed line 41 is electrically connected to the first feed unit 201, the signal line at the second end 4012 of the main feed line of the first feed line 41 is electrically connected to the first radiation unit 101, and the ground line of the main feed line 401 of the first feed line 41 is grounded. The signal line and the ground line at the first end 4021 of the sub-feed line of the first feed line 41 are electrically connected to the signal line and the ground line of the main feed line 401 of the first feed line 41, and the signal line and the ground line at the second end 4022 of the sub-feed line of the first feed line 41 are electrically connected to the non-resonant unit 30 and the metal middle plate 221 respectively.

The signal line at the first end 4011 of the main feed line of the second feed line 42 is electrically connected to the second feed unit 202, the signal line at the second end 4012 of the main feed line of the second feed line 42 is electrically connected to the second radiation unit 102, and the ground line of the main feed line 401 of the second feed line 42 is grounded. The signal line and the ground line at the first end 4021 of the sub-feed line of the second feed line 42 are electrically connected to the signal line and the ground line of the main feed line 401 of the second feed line 42, and the signal line and the ground line at the second end 4022 of the sub-feed line of the second feed line 42 are electrically connected to the non-resonant unit 30 and the metal middle plate 221 respectively.

In this way, the first feed unit 201 is connected to the first radiation unit 101, the non-resonant unit 30, and the floor below the non-resonant unit 30 (that is, the metal middle plate 221) by using the first feed line 41, the second feed unit 202 is connected to the second radiation unit 102, the non-resonant unit 30, and the floor below the non-resonant unit 30 (that is, the metal middle plate 221) by using the second feed line 42. That is, through a line power distribution, the first feed unit 201 feeds the first radiation unit 101 and the non-resonant unit 30 by using the first feed line 41, and the second feed unit 202 feeds the second radiation unit 102 and the non-resonant unit 30 by using the second feed line 42, so that the non-resonant unit 30 can assist the first radiation unit 101 and the second radiation unit 102 in exciting the floor characteristic mode.

As an optional implementation, in FIG. 27, the first radiation unit 101 may be a low-frequency radiation unit, and the second radiation unit 102 may be a medium-frequency radiation unit. Certainly, in some other embodiments, the first radiation unit 101 and the second radiation unit 102 may be low frequency radiation units, or the first radiation unit 101 and the second radiation unit 102 may be medium-high frequency radiation units.

Figure 28:
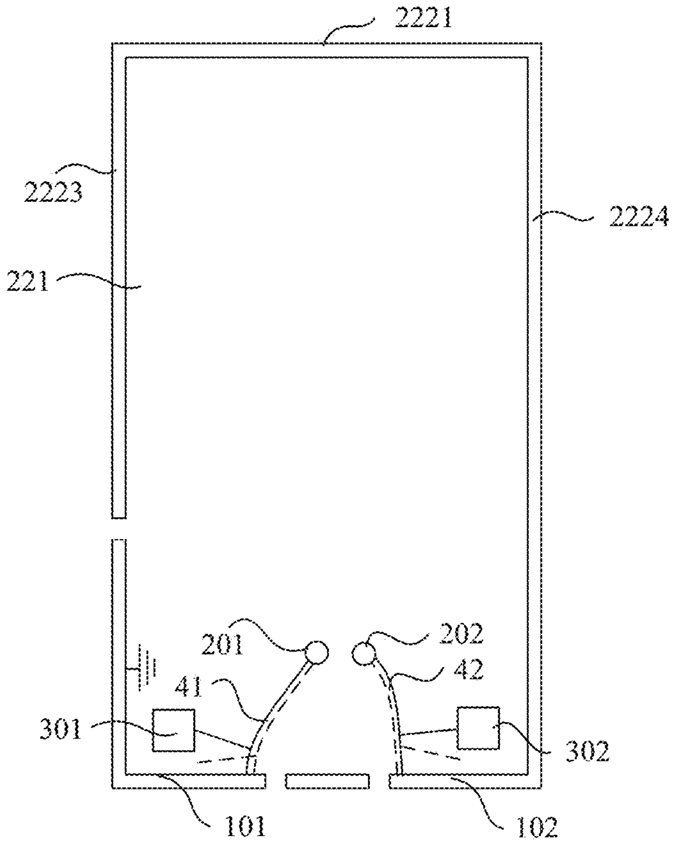
FIG. 28 is a schematic diagram of a structure of an antenna apparatus in an electronic device according to an embodiment of this application.

Further, in another embodiment, as shown in FIG. 28, a quantity of non-resonant units 30 may be two, and the at least one non-resonant unit 30 may include a first non-resonant unit 301 and a second non-resonant unit 302. A quantity of feed lines 40 may be at least two, and the at least one feed unit 20 may include a first feed unit 201 and a second feed unit 202. A feed point and a ground point of the first feed unit 201 may be electrically connected to the first non-resonant unit 301 and the metal middle plate 221 by using a first feed line 41 of the at least two feed lines 40, and a feed point and a ground point of the second feed unit 202 may be electrically connected to the second non-resonant unit 302 and the metal middle plate 221 by using a second feed line 42 of the at least two feed lines 40.

Similarly, the at least one radiation unit 10 may include a first radiation unit 101 and a second radiation unit 102. The signal line at the first end 4011 of the main feed line of the first feed line 41 is electrically connected to the first feed unit 201, the signal line at the second end 4012 of the main feed line of the first feed line 41 is electrically connected to the first radiation unit 101, and the ground line of the main feed line 401 of the first feed line 41 is grounded. The signal line and the ground line at the first end 4021 of the sub-feed line of the first feed line 41 are electrically connected to the signal line and the ground line of the main feed line 401 of the first feed line 41, and the signal line and the ground line at the second end 4022 of the sub-feed line of the first feed line 41 are electrically connected to the first non-resonant unit 301 and the metal middle plate 221 respectively.

The signal line at the first end 4011 of the main feed line of the second feed line 42 is electrically connected to the second feed unit 202, the signal line at the second end 4012 of the main feed line of the second feed line 42 is electrically connected to the second radiation unit 102, and the ground line of the main feed line 401 of the second feed line 42 is grounded. The signal line and the ground line at the first end 4021 of the sub-feed line of the second feed line 42 are electrically connected to the signal line and the ground line of the main feed line 401 of the second feed line 42, and the signal line and the ground line at the second end 4022 of the sub-feed line of the second feed line 45 are electrically connected to the second non-resonant unit 302 and the metal middle plate 221 respectively.

In this way, the first feed unit 201 is connected to the first radiation unit 101, the first non-resonant unit 301, and the floor below the first non-resonant unit 301 (that is, the metal middle plate 221) by using the first feed line 41, the second feed unit 202 is connected to the second radiation unit 102, the second non-resonant unit 302, and the floor below the second non-resonant unit 302 (that is, the metal middle plate 221) by using the second feed line 42. That is, through a line power distribution, the first feed unit 201 feeds the first radiation unit 101 and the first non-resonant unit 301 by using the first feed line 41, and the second feed unit 202 feeds the second radiation unit 102 and the second non-resonant unit 302 by using the second feed line 42, so that the first non-resonant unit 301 can assist the first radiation unit 101 in exciting the floor characteristic mode, and the second non-resonant unit 302 can assist the second radiation unit 102 in exciting the floor characteristic mode.

Figure 29:
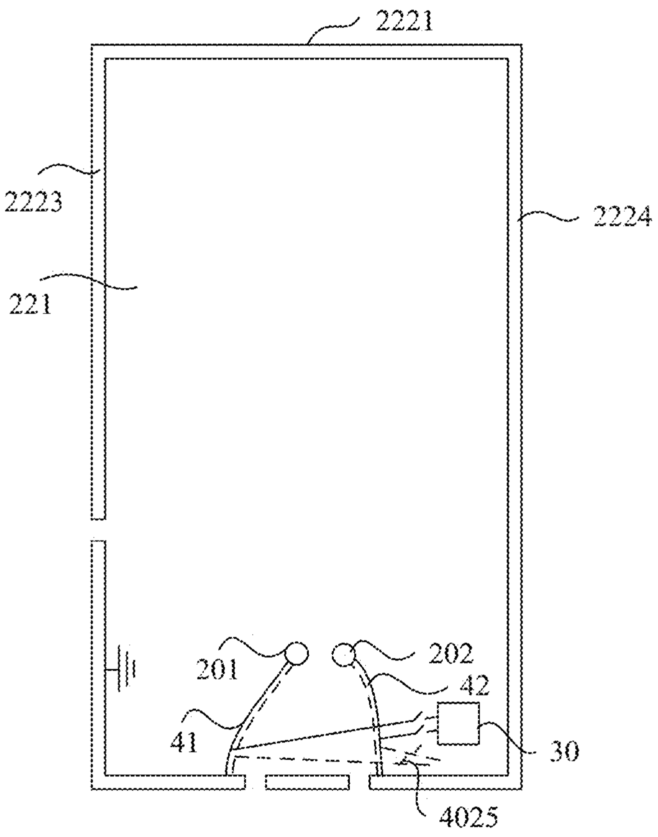
FIG. 29 is a schematic diagram of a structure of an antenna apparatus in an electronic device according to an embodiment of this application.

In addition, as an optional implementation, the sub-feed line 402 may be provided with a switch 4025 (as shown in FIG. 29), the switch 4025 is configured to select to turn on the non-resonant unit 30 (that is, the first non-resonant unit 301 or the second non-resonant unit 302) on the sub-feed line 402. The switch 4025 can control the main feed line 401 and the non-resonant unit 30 to be connected or disconnected, thereby ensuring flexible use. For example, if the non-resonant unit 30 is not required to assist in exciting the floor characteristic mode, the switch 4025 can be turned on; or if the non-resonant unit 30 is required to assist in exciting the floor characteristic mode, the switch 4025 can be turned off.

In descriptions of embodiments, it should be noted that, unless otherwise expressly specified and limited, the terms "installation", "connect", and "connection" should be understood in a broad sense, for example, may be a fixed connection, or may be an indirect connection by using an intermediate medium, or may be a communication between two elements or an interaction between two elements. A person of ordinary skill in the art can understand specific meanings of the foregoing terms in embodiments of this application based on a specific situation.

The apparatus or element referred to in or implied in embodiments of this application needs to have a specific orientation, be constructed and operated in a specific orientation, and therefore cannot be construed as a limitation on embodiments of this specification. In the descriptions of embodiments of this application, "a plurality of" means two or more, unless otherwise specifically defined.

In the specification of embodiments, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that embodiments described herein can be implemented in orders except the order illustrated or described herein. In addition, the terms "may include" and "have", and any variations thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

Finally, it should be noted that the foregoing embodiments are only used to illustrate the technical solutions of embodiments of this application, but are not used to limit this application. Although embodiments of this application has been described in detail with reference to the foregoing embodiments, it should be understood by a person of ordinary skill in the art that the technical solutions described in the foregoing embodiments may still be modified, or some or all technical features thereof are equivalently replaced. These modifications or replacements do not make the essence of the corresponding technical solutions depart from the scope of the technical solutions of embodiments of this application.

What is claimed is:

1. An antenna apparatus, applied to an electronic device, wherein the antenna apparatus comprises:

at least one radiation unit, at least one feed unit, and at least one non-resonant unit, wherein the feed unit directly feeds the radiation unit and the non-resonant unit separately; and a size of the non-resonant unit is less than ⅛λ, and λ is a wavelength corresponding to a resonance frequency of the radiation unit;

wherein a feed point and a ground point of the feed unit are respectively electrically connected to the non-resonant unit and a metal middle plate used as a floor in the electronic device;

wherein the non-resonant unit is configured to assist in exciting a floor characteristic mode; and when the radiation unit is a low-frequency radiation unit, the non-resonant unit assists in exciting a floor longitudinal characteristic mode; or when the radiation unit is a medium-high frequency radiation unit, the non-resonant unit assists in exciting a floor transverse characteristic mode;

wherein an orthographic projection that is of the non-resonant unit and that is in a first direction is located in the metal middle plate; and the first direction is the direction perpendicular to a plane in which the metal middle plate is located.

2. The antenna apparatus according to claim 1, wherein the feed unit is electrically connected to each of the non-resonant unit and the metal middle plate by using a feed line.

3. The antenna apparatus according to claim 2, wherein each feed line comprises a main feed line and a sub-feed line, the main feed line and the sub-feed line each comprise a signal line and a ground line, a signal line at a first end of the main feed line is electrically connected to the feed unit, and a signal line at a second end of the main feed line is electrically connected to the radiation unit; and the ground line of the main feed line is grounded; and a signal line and a ground line at a first end of the sub-feed line are electrically connected to the signal line and the ground line of the main feed line, and a signal line and a ground line at a second end of the sub-feed line are electrically connected to the non-resonant unit and the metal middle plate respectively.

4. The antenna apparatus according to claim 3, wherein the sub-feed line is a coaxial line and comprises an outer conductor and an inner conductor; and the outer conductor is wrapped outside the inner conductor, the inner conductor is the signal line, and the outer conductor is the ground line; and one end of the inner conductor is electrically connected to the signal line of the main feed line, and the other end of the inner conductor is electrically connected to the non-resonant unit; and one end of the outer conductor is electrically connected to the ground line of the main feed line, and the other end of the outer conductor is electrically connected to the metal middle plate.

5. The antenna apparatus according to claim 3, wherein the main feed line is a microstrip line comprising a first conductor and a second conductor, the first conductor is the signal line, the second conductor is the ground line, and the first conductor is separated from the second conductor.

6. The antenna apparatus according to claim 5, wherein a quantity of non-resonant units is one;

a quantity of feed lines is at least two; the at least one feed unit comprises a first feed unit and a second feed unit; and a feed point and a ground point of the first feed unit are respectively electrically connected to the non-resonant unit and the metal middle plate by using a first feed line of the at least two feed lines, and a feed point and a ground point of the second feed unit are respectively electrically connected to the non-resonant unit and the metal middle plate by using a second feed line of the at least two feed lines.

7. The antenna apparatus according to claim 6, wherein the at least one radiation unit comprises a first radiation unit and a second radiation unit;

the signal line at the first end of the main feed line of the first feed line is electrically connected to the first feed unit, and the signal line at the second end of the main feed line of the first feed line is electrically connected to the first radiation unit; the ground line of the main feed line of the first feed line is grounded; and the signal line and the ground line at the first end of the sub-feed line of the first feed line are electrically connected to the signal line and the ground line of the main feed line of the first feed line, and the signal line and the ground line at the second end of the sub-feed line of the first feed line are electrically connected to the non-resonant unit and the metal middle plate respectively; and the signal line at the first end of the main feed line of the second feed line is electrically connected to the second feed unit, and the signal line at the second end of the main feed line of the second feed line is electrically connected to the second radiation unit; the ground line of the main feed line of the second feed line is grounded; and the signal line and the ground line at the first end of the sub-feed line of the second feed line are electrically connected to the signal line and the ground line of the main feed line of the second feed line, and the signal line and the ground line at the second end of the sub-feed line of the second feed line are electrically connected to the non-resonant unit and the metal middle plate respectively.

8. The antenna apparatus according to claim 5, wherein a quantity of non-resonant units is two;

the at least one non-resonant unit comprises a first non-resonant unit and a second non-resonant unit;

a quantity of feed lines is at least two; the at least one feed unit comprises a first feed unit and a second feed unit; and the first feed unit is electrically connected to each of the first non-resonant unit and the metal middle plate by using a first feed line of the at least two feed lines, and the second feed unit is electrically connected to each of the second non-resonant unit and the metal middle plate by using a second feed line of the at least two feed lines.

9. The antenna apparatus according to claim 8, wherein the at least one radiation unit comprises a first radiation unit and a second radiation unit;

the signal line at the first end of the main feed line of the first feed line is electrically connected to the first feed unit, and the signal line at the second end of the main feed line of the first feed line is electrically connected to the first radiation unit; the ground line of the main feed line of the first feed line is grounded; and the signal line and the ground line at the first end of the sub-feed line of the first feed line are electrically connected to the signal line and the ground line of the main feed line of the first feed line, and the signal line and the ground line at the second end of the sub-feed line of the first feed line are electrically connected to the first non-resonant unit and the metal middle plate respectively; and the signal line at the first end of the main feed line of the second feed line is electrically connected to the second feed unit, and a signal line at a second end of the main feed line of the second feed line is electrically connected to the second radiation unit; the ground line of the main feed line of the second feed line is grounded; and the signal line and the ground line at the first end of the sub-feed line of the second feed line are electrically connected to the signal line and the ground line of the main feed line of the second feed line, and the signal line and the ground line at the second end of the sub-feed line of the second feed line are electrically connected to the second non-resonant unit and the metal middle plate respectively.

10. An antenna apparatus according to claim 9, wherein the first radiation unit is a low frequency radiation unit, and the second radiation unit is a medium-high frequency radiation unit.

11. The antenna apparatus according to claim 10, wherein the sub-feed line is provided with a switch for selecting to turn on the non-resonant unit on the sub-feed line.

12. The antenna apparatus according to claim 11, wherein the radiation unit is a metal border frame antenna, and the non-resonant unit is disposed close to the metal border frame antenna.

13. An electronic device, wherein the electronic device comprises at least a display, a rear housing, and a middle frame between the display and the rear housing, and further comprises the antenna apparatus according to claim 3.

14. The electronic device according to claim 13, wherein the middle frame is a metal middle frame, the metal middle frame comprises at least a metal border frame and a metal middle plate, and the metal border frame is disposed around an outer periphery of the metal middle plate; and the metal border frame forms a metal border frame antenna, and the metal border frame antenna is used as at least one radiation unit in the antenna apparatus.

* * * * *